(12) United States Patent
Terada et al.

(10) Patent No.: US 11,118,898 B2
(45) Date of Patent: Sep. 14, 2021

(54) METHOD FOR PRODUCING PREPARATION FOR FIBER LENGTH MEASUREMENT, METHOD FOR PREPARING DISPERSION LIQUID FOR FIBER LENGTH MEASUREMENT, METHOD FOR MEASURING FIBER LENGTH, PREPARATION FOR FIBER LENGTH MEASUREMENT, FIBER LENGTH MEASUREMENT APPARATUS, AND CONTROL COMPUTER PROGRAM FOR FIBER LENGTH MEASUREMENT APPARATUS

(71) Applicants: NATIONAL UNIVERSITY CORPORATION TOKAI NATIONAL HIGHER EDUCATION AND RESEARCH SYSTEM, Nagoya (JP); TORAY INDUSTRIES, INC., Tokyo (JP); AISIN SEIKI KABUSHIKI KAISHA, Kariya (JP); KYOWA INDUSTRIAL CO., LTD., Sanjo (JP)

(72) Inventors: Mariko Terada, Aichi (JP); Atsuhiko Yamanaka, Aichi (JP); Yukitane Kimoto, Aichi (JP); Koji Shiraki, Shizuoka (JP); Yuji Hotta, Aichi (JP); Daisuke Shimamoto, Aichi (JP)

(73) Assignees: NATIONAL UNIVERSITY CORPORATION TOKAI NATIONAL HIGHER EDUCATION AND RESEARCH SYSTEM, Nagoya (JP); TORAY INDUSTRIES, INC., Tokyo (JP); AISIN SEIKI KABUSHIKI KAISHA, Kariya (JP); KYOWA INDUSTRIAL CO., LTD, Sanjo (JP)

(*) Notice: Subject to any disclaimer, the term of this patent is extended or adjusted under 35 U.S.C. 154(b) by 0 days.

(21) Appl. No.: 16/652,883

(22) PCT Filed: Oct. 2, 2018

(86) PCT No.: PCT/JP2018/036949
§ 371 (c)(1),
(2) Date: Apr. 1, 2020

(87) PCT Pub. No.: WO2019/069954
PCT Pub. Date: Apr. 11, 2019

(65) Prior Publication Data
US 2020/0300606 A1    Sep. 24, 2020

(30) Foreign Application Priority Data
Oct. 3, 2017    (JP) .............................. JP2017-193770

(51) Int. Cl.
*G01B 11/02*    (2006.01)
*G01N 1/38*    (2006.01)
*G06T 7/00*    (2017.01)

(52) U.S. Cl.
CPC ............... *G01B 11/02* (2013.01); *G01N 1/38* (2013.01); *G06T 7/0004* (2013.01); *G06T 2207/30124* (2013.01)

(58) Field of Classification Search
CPC ........ G01B 11/02; G01N 1/38; G06T 7/0004; G06T 2207/30124
See application file for complete search history.

(56) References Cited

U.S. PATENT DOCUMENTS

| | | | |
|---|---|---|---|
| 2015/0079866 A1 | 3/2015 | Chao et al. | |
| 2016/0130424 A1* | 5/2016 | Nakagawa | C08L 77/06 524/413 |
| 2017/0009201 A1 | 1/2017 | Hayashi et al. | |

FOREIGN PATENT DOCUMENTS

| JP | 2002-5924 A | 1/2002 |
|---|---|---|
| JP | 2005-233942 A | 9/2005 |

(Continued)

OTHER PUBLICATIONS

International Search Report, issued in PCT/JP2018/036949, PCT/ISA/210, dated Nov. 13, 2018.

(Continued)

*Primary Examiner* — Jamil Ahmed
(74) *Attorney, Agent, or Firm* — Birch, Stewart, Kolasch & Birch, LLP

(57) ABSTRACT

A method for producing a preparation for fiber length measurement includes: a preliminary dispersion process of adding fibers and a dispersion medium with a viscosity of 500 Pa·s to 10,000 Pa·s to a sealable container so as to give a concentration of the fibers of 0.1% by mass or less and shaking the container to prepare a preliminary dispersion liquid; a dispensing process of dispensing part of the preliminary dispersion liquid to another sealable container; a dilution process of adding the dispersion medium to the dispensed preliminary dispersion liquid so as to give a concentration of the fibers of 0.005% by mass or less and shaking the container to prepare a dispersion liquid for measuring fiber length; and a casting process of spreading part of the dispersion liquid for measuring fiber length onto a base having light transparency.

21 Claims, 15 Drawing Sheets

(56) References Cited

FOREIGN PATENT DOCUMENTS

| | | |
|---|---|---|
| JP | 2006-8857 A | 1/2008 |
| JP | 2008-190909 A | 8/2008 |
| JP | 2014-771 A | 1/2014 |

OTHER PUBLICATIONS

Sato et al., "Development of Dispersion and Length-evaluation Methods of Vapor-grown Carbon Fiber", TANSO, 2003, No. 209, p. 159-164.
Terada et al., "The Method for Measurement of Fiber Length Distribution for Discontinuous Carbon Fiber Reinforced Thermoplastic Composites", the 7th Japan Conference on Composite Material (JCCM-7) Preprints, 1D-13 (2016), total 4 pages.
Written Opinion of the International Searching Authority, issued in PCT/JP2018/036949, PCT/ISA/237, dated Nov. 13, 2018.
Partial Supplernentary European Search Report for European Application No. 18864661.6, dated Jun. 9, 2021.

* cited by examiner

METHOD FOR PRODUCING PREPARATION FOR FIBER LENGTH MEASUREMENT, METHOD FOR PREPARING DISPERSION LIQUID FOR FIBER LENGTH MEASUREMENT, METHOD FOR MEASURING FIBER LENGTH, PREPARATION FOR FIBER LENGTH MEASUREMENT, FIBER LENGTH MEASUREMENT APPARATUS, AND CONTROL COMPUTER PROGRAM FOR FIBER LENGTH MEASUREMENT APPARATUS

FIELD

The present invention relates to a method for producing a preparation for fiber length measurement for discontinuous reinforcing fibers such as carbon fibers, a method for preparing a dispersion liquid for fiber length measurement, a method for measuring a fiber length, a preparation for fiber length measurement, a fiber length measurement apparatus, and a control computer program for a fiber length measurement apparatus.

BACKGROUND

Fiber reinforced plastics (hereinafter, also called "FRP") with improved strength by blending fibers such as carbon fibers into plastics are being used for various uses. The length of reinforcing fibers blended into plastics is important technical information for understanding the properties of FRP and phenomena during molding.

Disclosed as a method for measuring a glass fiber length in FRP is a method that uniformly disperses glass fibers obtained by eluting or thermally decomposing an FRP resin in 1,000 times or more amount of liquid, extracts part of the dispersion liquid, dilutes it, extracts a uniform dispersion liquid with a glass fiber weight of 0.1 to 2 mg, and extracts the glass fibers by filtration or dispersion to measure a fiber length (refer to Patent Literature 1, for example).

Developed is a method that adds carbon fibers as an object of fiber length measurement to a polymer solution with a certain concentration and performs high-speed stirring to obtain a uniform dispersion liquid, then casts the whole or part of this uniform dispersion liquid onto a disposal tray to prepare a sheet-shaped sample, and performs image analysis on this sheet-shaped sample to measure fiber length distribution (refer to Non Patent Literature 1, for example).

CITATION LIST

Patent Literature

Patent Literature 1: Japanese Patent Application Laid-open No. 2002-5924
Non Patent Literature 1: Mariko Terada, Atsuhiko Yamanaka, Daisuke Shimamoto, and Yuji Hotta, the 7th Japan Conference on Composite Material (JCCM-7) Preprints, 1D-13 (2016).

SUMMARY

Technical Problem

Patent Literature 1 states that a representative of a sample can be extracted in a short time by uniformly dispersing the glass fibers in the certain or more amount of liquid and extracting the partial uniform dispersion liquid from the uniform dispersion liquid.

However, Patent Literature 1 uses water or a mixture of water and an organic solvent as the liquid dispersing glass, which requires an extremely large physical force in order to disperse the glass fibers, and the fibers may be broken. Even if they are dispersed, they settle in a short time, and it is extremely difficult to extract a representative uniform dispersion liquid out of the dispersion liquid.

Non Patent Literature 1, which uses the polymer solution as the dispersion medium, is more favorable in a dispersion state than that of Patent Literature 1 and easily maintains it, and a dispersion liquid closer to the uniform dispersion liquid can be dispensed as a representative. However, in Non Patent Literature 1, high-speed stirring is performed with a stirrer, and the carbon fibers as an object of fiber length measurement are broken by the stirring, which makes measurement of the fiber length of the carbon fibers in a state contained in FRP difficult.

The present invention has been made in view of the above, and an object thereof is to provide a method for producing a preparation for fiber length measurement, a method for preparing a dispersion liquid for fiber length measurement, a method for measuring a fiber length, a preparation for fiber length measurement, a fiber length measurement apparatus, and a control computer program for a fiber length measurement apparatus that can measure the fiber length of reinforcing fibers with less sampling bias and efficiently.

Solution to Problem

To solve the problem described above and to achieve the object, a method for producing a preparation for fiber length measurement according to the present invention includes: a preliminary dispersion process of adding fibers and a dispersion medium with a viscosity of 500 Pa·s to 10,000 Pa·s to a sealable container so as to give a concentration of the fibers of 0.1% by mass or less and shaking the container to prepare a preliminary dispersion liquid; a dispensing process of dispensing part of the preliminary dispersion liquid to another sealable container; a dilution process of adding the dispersion medium to the dispensed preliminary dispersion liquid so as to give a concentration of the fibers of 0.005% by mass or less and shaking the container to prepare a dispersion liquid for measuring fiber length; and a casting process of spreading part of the dispersion liquid for measuring fiber length onto a base having light transparency.

In the method for producing a preparation for fiber length measurement according to the present invention, the dispersion medium has light transparency and has a color different from that of the fibers.

In the method for producing a preparation for fiber length measurement according to the present invention, the dispersion medium is a solution in which a polymer is dissolved in a solvent, and the polymer has film formability.

In the method for producing a preparation for fiber length measurement according to the present invention, the dispensing process includes evenly allocating a whole amount of the preliminary dispersion liquid to a plurality of sealable containers, and the dilution process includes diluting the preliminary dispersion liquid allocated to each of the sealable containers with the dispersion medium.

The method for producing a preparation for fiber length measurement according to the present invention performs, after the casting process, a polymer coating formation process removing the solvent in the dispersion medium by heating to form a coating of the polymer on the base.

A method for preparing a dispersion liquid for fiber length measurement according to the present invention includes: a preliminary dispersion process of adding fibers and a dispersion medium with a viscosity of 500 Pa·s to 10,000 Pa·s to a sealable container so as to give a concentration of the fibers of 0.1% by mass or less and shaking the container to prepare a preliminary dispersion liquid; a dispensing process of dispensing part of the preliminary dispersion liquid to another sealable container; and a dilution process of adding the dispersion medium to the dispensed preliminary dispersion liquid so as to give a concentration of the fibers of 0.005% by mass or less and shaking the container to prepare a dispersion liquid for measuring fiber length.

In the method for preparing a dispersion liquid for fiber length measurement according to the present invention, the dispersion medium has light transparency and has a color different from that of the fibers.

In the method for preparing a dispersion liquid for fiber length measurement according to the present invention, the dispersion medium is a solution in which a polymer is dissolved in a solvent, and the polymer has film formability.

In the method for preparing a dispersion liquid for fiber length measurement according to the present invention, the dispensing process includes evenly allocating a whole amount of the preliminary dispersion liquid to a plurality of sealable containers, and the dilution process includes diluting the preliminary dispersion liquid allocated to each of the sealable containers with the dispersion medium.

A method for measuring a fiber length according to the present invention is a method for measuring a fiber length using a preparation for fiber length measurement produced by any one of the above-mentioned methods. The method includes: an image acquisition process of acquiring an image of the preparation for fiber length measurement; an image processing process of acquiring a binary-converted image of the image; and a measurement process of measuring a fiber length of the fibers contained in the preparation for fiber length measurement from the binary-converted image.

The method for measuring a fiber length according to the present invention includes a calculation process of determining fiber length distribution, a median, a number average fiber length and/or a weight average fiber length of the fibers from the fiber length of the fibers contained in the preparation for fiber length measurement measured at the measurement process.

In the method for measuring a fiber length according to the present invention, the preparation for fiber length measurement is produced by: the dispensing process evenly allocating a whole amount of a preliminary dispersion liquid to a plurality of sealable containers; and the dilution process diluting the preliminary dispersion liquid allocated to each of the sealable containers with the dispersion medium, and the calculation process determines the fiber length distribution, the median, the number average fiber length and/or the weight average fiber length from the fiber length of the fibers of the preparation for fiber length measurement each produced from at least one dispersion liquid for fiber length measurement obtained from each type of the preliminary dispersion liquid allocated at the dispensing process.

In the method for measuring a fiber length according to the present invention, the calculation process determines the fiber length distribution, the median, the number average fiber length and/or the weight average fiber length from the fiber length of the fibers of the preparation for fiber length measurement DEP represented by Expression (1) below of which is 0.7 to 1.3:

$$DEP = \frac{Wcounted}{Wpredicted} \quad (1)$$

Wcounted: a total of a mass of the fibers in the preparation for fiber length measurement calculated from the fiber length of the fibers in the preparation for fiber length measurement determined by measurement;

Wpredicted: a total of a mass of the fibers contained in the preparation for fiber length measurement predicted from a mass and a concentration of the dispersion liquid for fiber length measurement used for production of the preparation for fiber length measurement.

In the method for measuring a fiber length according to the present invention, when DEP of the preparation for fiber length measurement is not 0.7 to 1.3, the calculation process measures a fiber length of the fibers of a preparation for fiber length measurement produced using a dispersion liquid for fiber length measurement again prepared from a preliminary dispersion liquid of the same type as the dispersion liquid for fiber length measurement used for the preparation for fiber length measurement to determine the fiber length distribution, the median, the number average fiber length and/or the weight average fiber length.

A preparation for fiber length measurement according to the present invention includes: a base having light transparency; and a polymer coating laminated on the base, containing fibers, and having light transparency, the polymer coating having a color different from that of the fibers.

In the preparation for fiber length measurement according to the present invention, the base is a polymer film with a thickness of 50 μm to 3,000 μm, and a thickness of the polymer coating is ½ or more of a diameter of the fibers.

In the preparation for fiber length measurement according to the present invention, the polymer coating is formed by spreading a dispersion liquid for fiber length measurement containing the fibers and a dispersion medium with a concentration of the fibers of 0.005% by mass or less onto the base and removing a solvent, the dispersion medium having a viscosity of 500 Pa·s to 10,000 Pa·s.

In the preparation for fiber length measurement according to the present invention, DEP represented by Expression (1) below is 0.7 to 1.3:

$$DEP = \frac{Wcounted}{Wpredicted} \quad (1)$$

Wcounted: a total of a mass of the fibers in the preparation for fiber length measurement calculated from the fiber length of the fibers in the preparation for fiber length measurement determined by measurement;

Wpredicted: a total of a mass of the fibers contained in the preparation for fiber length measurement predicted from a mass and a concentration of the dispersion liquid for fiber length measurement used for production of the preparation for fiber length measurement.

A fiber length measurement apparatus according to the present invention includes: an image acquisition unit configured to acquire a digital image of a preparation for fiber length measurement produced by any one of the above-mentioned methods; an image processing unit configured to perform image processing on the digital image to generate a binary-converted image; a fiber length measurement unit configured to measure a fiber length of the fibers contained in the preparation for fiber length measurement from the binary-converted image; and a fiber length calculation unit configured to calculate fiber length distribution, a median, a number average fiber length and/or a weight average fiber length from the measured fiber length of the fibers.

In the fiber length measurement apparatus according to the present invention, further includes: a DEP calculation unit configured to calculate DEP of the preparation for fiber length measurement represented by Expression (1) below:

$$DEP = \frac{Wcounted}{Wpredicted} \quad (1)$$

Wcounted: a total of a mass of the fibers of the preparation for fiber length measurement calculated from the fiber length of the fibers in the preparation for fiber length measurement determined by measurement; Wpredicted: a total of a mass of the fibers contained in the preparation for fiber length measurement predicted from a mass and a concentration of the dispersion liquid for fiber length measurement used for production of the preparation for fiber length measurement; a determination unit configured to determine whether DEP of the preparation for fiber length measurement is 0.7 to 1.3; and a controller configured to cause a storage unit to store therein only the fiber length of the preparation for fiber length measurement, DEP of which is 0.7 to 1.3, wherein the fiber length calculation unit is configured to calculate the fiber length distribution, the median, the number average fiber length and/or the weight average fiber length using only the fiber length stored in the storage unit.

A control computer program for a fiber length measurement apparatus according to the present invention executes: an image acquisition procedure of acquiring a digital image of a preparation for fiber length measurement produced by any one of the above-mentioned methods; an image processing procedure of performing image processing on the digital image to generate a binary-converted image; a fiber length measurement procedure of measuring a fiber length of the fibers contained in the preparation for fiber length measurement from the binary-converted image; and a fiber length calculation procedure of calculating a number average fiber length and/or a weight average fiber length from the fiber length of the fibers.

Advantageous Effects of Invention

In the method for producing a preparation for fiber length measurement, the method for preparing a dispersion liquid for fiber length measurement, the method for measuring a fiber length, the preparation for fiber length measurement, the fiber length measurement apparatus, and the control computer program for a fiber length measurement apparatus of the present invention, the fiber length of fibers can be measured with less bias in sampling from a lot and efficiently.

DESCRIPTION OF EMBODIMENTS

The length of reinforcing fibers present in FRP is not a fixed value and is distributed in many cases (in the present specification, reinforcing fibers having a fiber length that is not a fixed value and is distributed are called "discontinuous reinforcing fibers"). To measure the fiber length distribution of the discontinuous reinforcing fibers as a reliable representative value, bias in sampling from the discontinuous reinforcing fibers is required to be reduced.

When the fiber length of the discontinuous reinforcing fibers in an injection molded product using pellets containing reinforcing fibers is measured, generally, a small piece out of the molded product is cut, the discontinuous reinforcing fibers are extracted by eluting or thermally decomposing a resin (a lot), an extremely small part thereof is extracted as a sample, the image of the extremely small part is enlarged under a microscope, about a few hundred fiber lengths of the enlarged discontinuous reinforcing fibers are measured, and fiber length distribution and the like are calculated.

However, when the sample is extracted from the lot, a larger difference in size between the lot and the sample provides a larger error at the time of dispensing. More non-uniform lot contents (variations in fiber length) provide a larger error.

The present invention first prepares a preliminary dispersion liquid with an extremely higher ratio to a conventional one in the entire lot of the discontinuous reinforcing fibers to be measured or a sample amount relative to the lot, performs dispensing and dilution of this preliminary dispersion liquid, that is, dilution in multiple stages to prepare a dispersion liquid for fiber length measurement, and can reduce an error of an increment (a sample to be measured) relative to the lot. A method for producing a preparation for fiber length measurement, a method for preparing a dispersion liquid for fiber length measurement, a method for measuring a fiber length, a preparation for fiber length measurement, a fiber length measurement apparatus, and a control computer program for a fiber length measurement apparatus of the present invention can suitably be used for measurement of the fiber length of the discontinuous reinforcing fibers and can also be used for measurement of the fiber length of reinforcing fibers with the fiber length controlled or fibers other than reinforcing fibers.

The following describes the method for producing a preparation for fiber length measurement, the method for preparing a dispersion liquid for fiber length measurement, the method for measuring a fiber length, the preparation for fiber length measurement, the fiber length measurement apparatus, and the control computer program for a fiber length measurement apparatus of the present invention in more detail.

<Preparation of Dispersion Liquid for Fiber Length Measurement>

Figure 1:
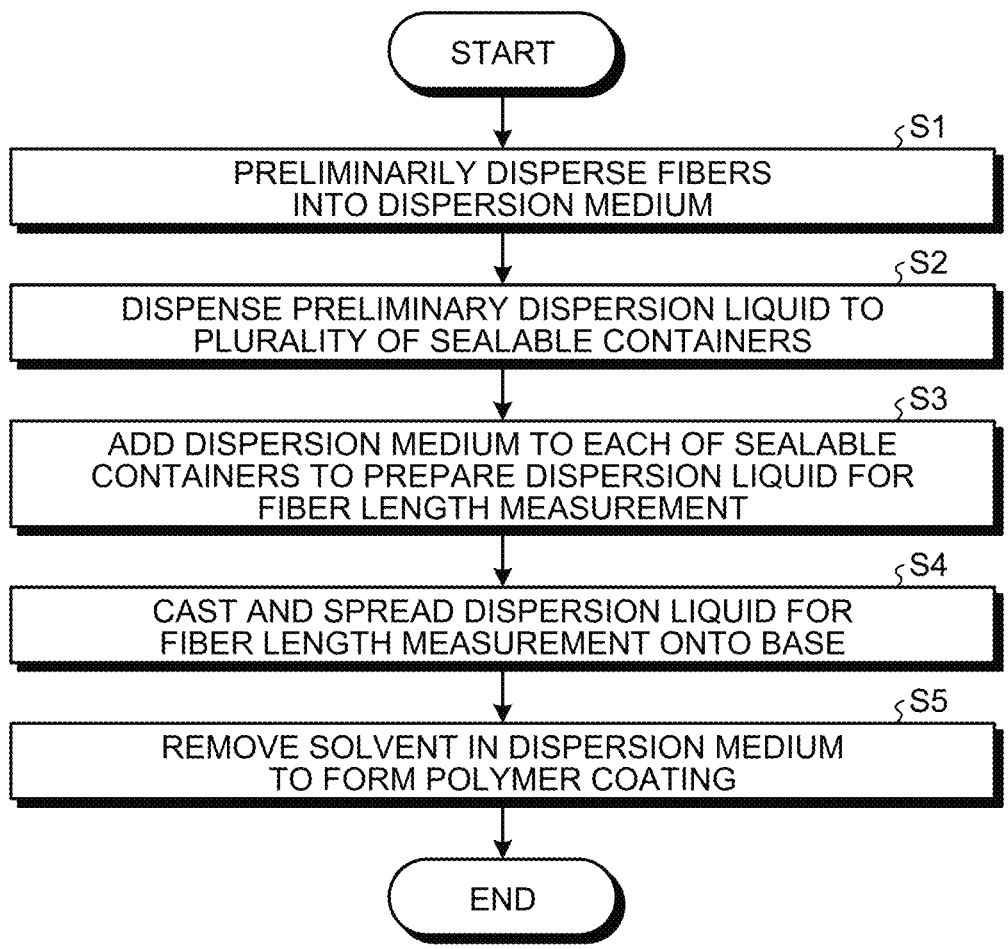
FIG. 1 is a flowchart illustrating an exemplary process for producing a preparation for fiber length measurement according to an embodiment of the present invention.

FIG. 1 is a flowchart illustrating a process for producing a preparation for fiber length measurement according to the embodiment of the present invention. A process for preparing a dispersion liquid for fiber length measurement corresponds to Step S1 to Step S3 in FIG. 1. In the present invention, preparation of the dispersion liquid for fiber length measurement is performed by a preliminary dispersion process (Step S1) that adds fibers and a dispersion medium with a viscosity of 500 Pa·s to 10,000 Pa·s to a sealable container so as to give a concentration of 0.1% by mass or less and shakes the container to prepare a preliminary dispersion liquid, a dispensing process (Step S2) that dispenses part of the preliminary dispersion liquid to another sealable container, and a dilution process (Step S3) that adds the dispersion medium to the dispensed preliminary dispersion liquid so as to give a fiber concentration of 0.005% by mass or less and shakes the container to prepare the dispersion liquid for fiber length measurement. The "concentration" generally means the proportion of a solute in a solution; in the present specification, the "concentration" is used as the proportion of fibers in a dispersion liquid (including the preliminary dispersion liquid and the dispersion liquid for fiber length measurement). In the present specification, a dispersion liquid in which fibers are directly (first) dispersed in the dispersion medium is called the preliminary dispersion liquid, whereas a dispersion liquid with the fiber concentration diluted to a certain value or less to enable fiber length measurement is called the dispersion liquid for fiber length measurement.

The fibers used in the present invention have a fiber length of about 0.1 mm to 30 mm; in particular, they have a length of about 1 mm to 10 mm and can be used for a sample having fiber length distribution (containing fibers having different lengths).

The fibers as an object of fiber length measurement are dispersed in a dispersion medium with a viscosity of 500 Pa·s to 10,000 Pa·s to be the preliminary dispersion liquid. The viscosity of the dispersion medium is set to 500 Pa·s or more, whereby a shear force is exerted between the fibers and the dispersion medium, making dispersion easy. Settling of the fibers after dispersion is delayed. The viscosity of the dispersion medium is set to 10,000 Pa·s or less, whereby when the container containing the preliminary dispersion liquid is shaken, dispersion is easy through the flowing of the preliminary dispersion liquid.

The dispersion medium may have a viscosity of 500 Pa·s to 10,000 Pa·s; although an organic solvent such as glycerin can singly be used, a solution in which a polymer is dissolved in a solvent is preferably used. The solvent may be one dissolving the used polymer; water or an organic solvent such as alcohol can suitably be used. As the polymer, polyvinyl alcohol or the like can be used. The dispersion medium preferably has light transparency; this is because observation when being observed as the preparation for fiber length measurement is easy. The dispersion medium preferably has a color different from that of the fibers. Furthermore, an antifoaming agent may be added to the dispersion medium.

The fiber concentration of the preliminary dispersion liquid is set to 0.1% by mass or less. Being 0.1% by mass or less can improve the uniformity of the preliminary dispersion liquid. The concentration of the preliminary dispersion liquid is set to 0.1% by mass or less, whereby when the preliminary dispersion liquid is dispensed to a plurality of containers to prepare a plurality of types of dispersion liquids for fiber length measurement, concentration differences among the dispersion liquids for fiber length measurement are made small, and sampling bias when the preparation for fiber length measurement is produced can be reduced. The concentration of the preliminary dispersion liquid is 0.1% by mass or less and preferably 0.085% by mass or less; when the concentration is extremely small, the amount of the preliminary dispersion liquid to be prepared is large, and shaking by the container is difficult. The concentration of the preliminary dispersion liquid is preferably 0.02% by mass or more.

Preparation of the preliminary dispersion liquid is performed with a sealable container. As the container, a substantially cylindrical container such as a plastic bottle having a volume about 1.5 to 2 times the amount of the preliminary dispersion liquid to be prepared and a height double or more the diameter of a bottom is used, whereby shaking operation is easy. The container is preferably colorless and transparent in order to visually check the uniformity of the preliminary dispersion liquid. For addition of the fibers and the dispersion medium, the container preferably has a wide mouth. In preparation of the preliminary dispersion liquid, the fibers and the dispersion medium are put into the container, which is lidded to be sealed, and is then shaken. Shaking may be performed by shaking the container with a hand in an up-and-down direction or a right-and-left direction or shaking the container reciprocally, circularly, or in a figure-eight manner with a shaker. Shaking is preferably performed in a turbulent manner, in which the travel direction of the dispersion medium is successively changed. Stirring with a stirrer or the like flocculates the fibers and prevents them from being dispersed. In addition, the fibers are highly possibly broken, and stirring with a stirrer is not performed in the present invention.

After preparation of the preliminary dispersion liquid (Step S1), part of the preliminary dispersion liquid is dispensed to another sealable container (Step S2). When the preliminary dispersion liquid is dispensed, it is preferably dispensed immediately after shaking. As the sealable container to which the preliminary dispersion liquid is dispensed, one similar to the container in which the preliminary dispersion liquid is prepared can be used. The sealable container to which the preliminary dispersion liquid is dispensed may have a size different from that of the container in which the preliminary dispersion liquid is prepared.

After dispensing of the preliminary dispersion liquid (Step S2), a dispersion medium is added so as to give a fiber concentration of 0.005% by mass or less, and the container is shaken to prepare the dispersion liquid for fiber length measurement (Step S3). As the dispersion medium to be added, one similar to the dispersion medium used for the preliminary dispersion liquid can be used. The fiber concentration of the dispersion liquid for fiber length measurement is set to 0.005% by mass or less, whereby observation of fibers in the preparation for fiber length measurement is easy. The dispersion medium used in the dilution process is preferably the same one as the dispersion medium used in the preliminary dispersion process; considering casting of the dispersion medium in a casting process described below, the viscosity of the dispersion liquid for fiber length measurement is preferably adjusted to 500 Pa·s to 4,000 Pa·s by diluting the dispersion liquid for fiber length measurement with a dispersion medium with a lower viscosity such as a low viscosity dispersion medium. The viscosity of the dispersion liquid for fiber length measurement is set to 500 Pa·s to 4,000 Pa·s, whereby when the preparation for fiber length measurement is produced as described below, the dispersion liquid for fiber length measurement is hard to drop out of a base and is easy to spread.

The dispensing process and the dilution process can be performed in one stage or may be performed in multiple stages, that is, the dispensing process and the dilution process may be performed a plurality of times to finally make the concentration of the dispersion liquid for fiber length measurement 0.005% by mass or less.

The dispensing process may be performed by dispensing part of the preliminary dispersion liquid to the other container; to further reduce the influence of sampling bias, the whole amount of the preliminary dispersion liquid is preferably evenly allocated to a plurality of other sealed containers, and at the dilution process, the dispersion liquids allocated to the sealed containers are preferably each diluted with the dispersion medium to prepare a plurality of types of dispersion liquids for fiber length measurement. Preparations for fiber length measurement are produced from the types of dispersion liquids for fiber length measurement, a fiber length is measured, and fiber length distribution and the like are calculated, whereby the accuracy of the fiber length distribution and the like can further be improved. When the whole amount of the preliminary dispersion liquid is allocated to the sealed containers, allocation is preferably performed immediately after shaking. Furthermore, allocation is preferably performed not by allocating the whole amount to one container at one time but in a divided manner a plurality of times. For example, when 100 mL is allocated to each of the containers, 20 mL is allocated to each of the containers, then the preliminary dispersion liquid is further shaken, and then 20 mL is allocated to each of the containers. Such divided allocations are successively performed to finally allocate 100 mL, whereby sampling bias can be reduced.

Figure 2:
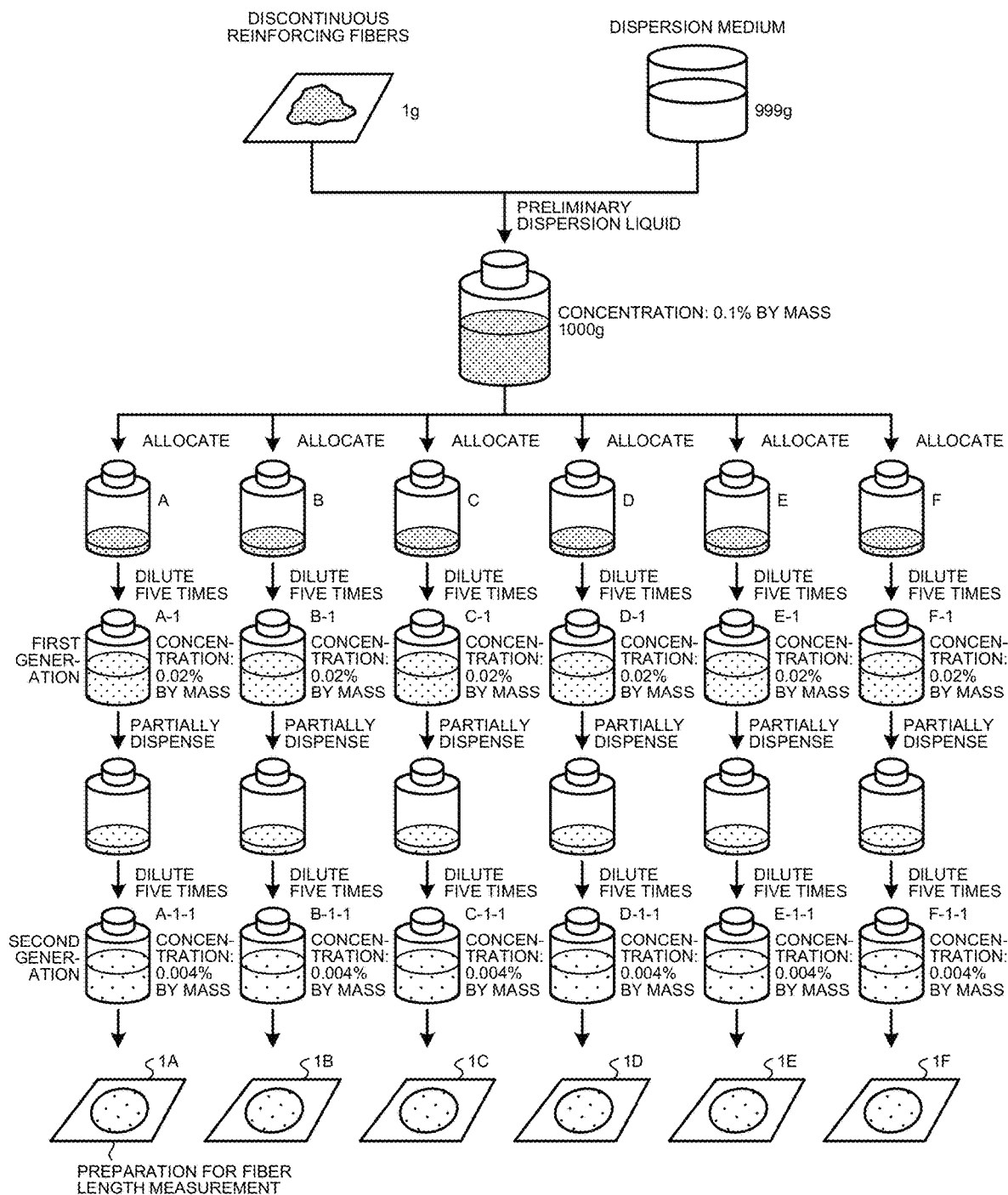
FIG. 2 is a schematic diagram illustrating the process for producing the preparation for fiber length measurement according to the embodiment of the present invention.

FIG. 2 is a schematic diagram illustrating the process for producing the preparation for fiber length measurement according to the embodiment of the present invention. In FIG. 2, a preliminary dispersion liquid with a concentration of 0.1% by mass is prepared with 1 g of fibers and 999 g of a dispersion medium, and the whole amount of the preliminary dispersion liquid is evenly allocated to Containers A to F. The preliminary dispersion liquids allocated to Containers A to F are diluted five times with a dispersion medium to be prepared as dispersion liquids with a concentration of 0.02% by mass (a first generation: A-1 to F-1). The first-generation dispersion liquids are partially dispensed to other containers and are diluted five times with the dispersion medium to prepare dispersion liquids for fiber length measurement with a concentration of 0.004% by mass (a second generation: A-1-1 to F-1-1). In FIG. 2, six types of dispersion liquids for fiber length measurement including Dispersion Liquid A-1-1 for Fiber Length Measurement of Type A dispensed and diluted from the preliminary dispersion liquid allocated to Container A, Dispersion Liquid B-1-1 for Fiber Length Measurement of Type B dispensed and diluted from the preliminary dispersion liquid allocated to Container B, Dispersion Liquid C-1-1 for Fiber Length Measurement of Type C dispensed and diluted from the preliminary dispersion liquid allocated to Container C, Dispersion Liquid D-1-1 for Fiber Length Measurement of Type D dispensed and diluted from the preliminary dispersion liquid allocated to Container D, Dispersion Liquid E-1-1 for Fiber Length Measurement of Type E dispensed and diluted from the preliminary dispersion liquid allocated to Container E, and Dispersion Liquid F-1-1 for Fiber Length Measurement of Type F dispensed and diluted from the preliminary dispersion liquid allocated to Container F are prepared, preparations for fiber length measurement are produced from the dispersion liquids for fiber length measurement of the respective types, and the fiber length is measured, whereby the fiber length distribution with the further reduced influence of sampling bias can be calculated.

<Production of Preparation for Fiber Length Measurement>

The process for producing the preparation for fiber length measurement corresponds to Step S4 to Step S5 in FIG. 1. The process for producing the preparation for fiber length measurement includes the casting process (Step S4) spreading part of the dispersion liquid for fiber length measurement with a fiber concentration of 0.005% by mass or less prepared at the dispensing process and the dilution process onto a base having light transparency and a polymer coating formation process (Step S5) removing the solvent in the dispersion medium by heating to form a coating of the polymer on the base.

Figure 3:
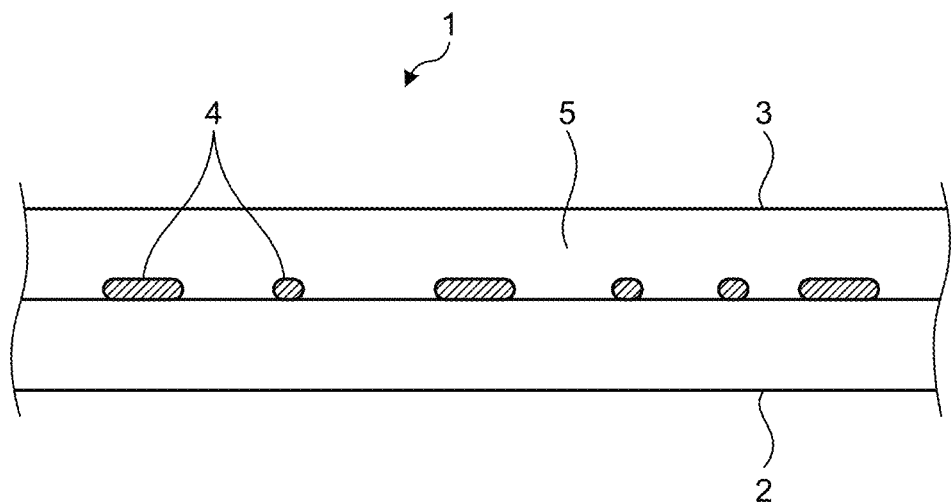
FIG. 3 is an enlarged sectional view of the preparation for fiber length measurement according to the embodiment of the present invention.

FIG. 3 is an enlarged sectional view of a preparation 1 for fiber length measurement according to the embodiment of the present invention. The preparation 1 for fiber length measurement includes a base 2 having light transparency and a polymer coating 3 laminated on the base 2, containing fibers 4, and having light transparency. The polymer coating 3 is a coating mainly containing a polymer 5 dissolved in a dispersion medium. The polymer coating 3 has a color different from that of the fibers 4. The fibers 4 are dispersed in the polymer coating 3 in a single yarn manner. The dispersion liquid for fiber length measurement is uniformly dispersed, whereby the fibers 4 are dispersed in the polymer coating 3 in a single yarn manner, and fiber length measurement through an image is easy. Furthermore, the preparation 1 for fiber length measurement, in which the polymer coating 3 closely adheres onto the base 2, can easily be transferred, is easily stored, and can be stored for a long term in less space.

The base 2 has light transparency and a color to the extent that the fibers 4 dispersed in a single yarn manner throughout the entire formed area of the polymer coating 3 can visually be recognized. The base 2 is not limited to a particular material so long as it is not dissolved in the dispersion medium and allows the polymer coating 3 to closely adhere thereto; in view of handleability, storage, and the like, a polymer film with a thickness of 50 m to 3,000 µm is preferred. As the base, an over head projector (OHP) film formed of resin such as polyethylene terephthalate can be used, for example. The polyethylene terephthalate film has good adhesiveness with the polymer coating 3 and can be suitably used as the base 2. Although a larger preparation 1 for fiber length measurement contains a larger amount of the fibers 4 and can reduce a sample error, it preferably has an A5 size in view of image acquisition. Although the preparation 1 for fiber length measurement preferably has the configuration in which the polymer coating 3 closely adheres to the base 2 in view of handleability, storage, and the like, the preparation 1 for fiber length measurement is not necessarily limited to the configuration in which the polymer coating 3 is laminated on the base 2 in view of measuring the fiber length and may have a configuration in which with a glass slide or a petri dish as the base 2, the dispersion liquid for fiber length measurement is spread onto the base 2.

The thickness of the polymer coating 3 is preferably ½ or more of the diameter of the fibers 4. The film thickness of the polymer coating 3 is set to ½ or more of the diameter of the fibers 4, whereby the fibers 4 can be held within the polymer coating 3. The upper limit of the film thickness of the polymer coating 3 may be set as appropriate considering the concentration of the used dispersion liquid for fiber length measurement and the like and is preferably 3,000 µm or less in view of easiness of fiber length measurement and the like.

Figure 4:
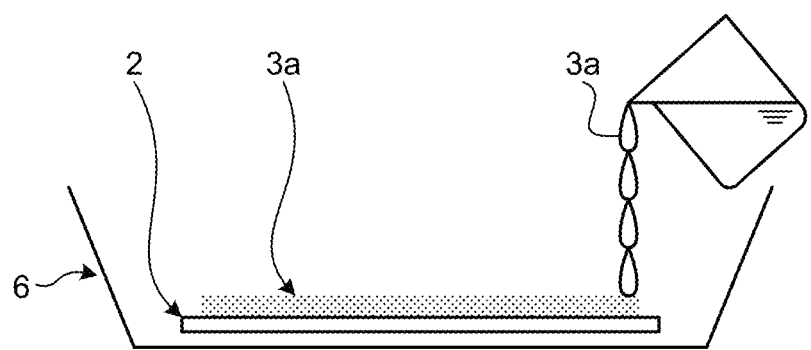
FIG. 4 is a diagram illustrating production of the preparation for fiber length measurement according to the embodiment of the present invention.
Figure 5:
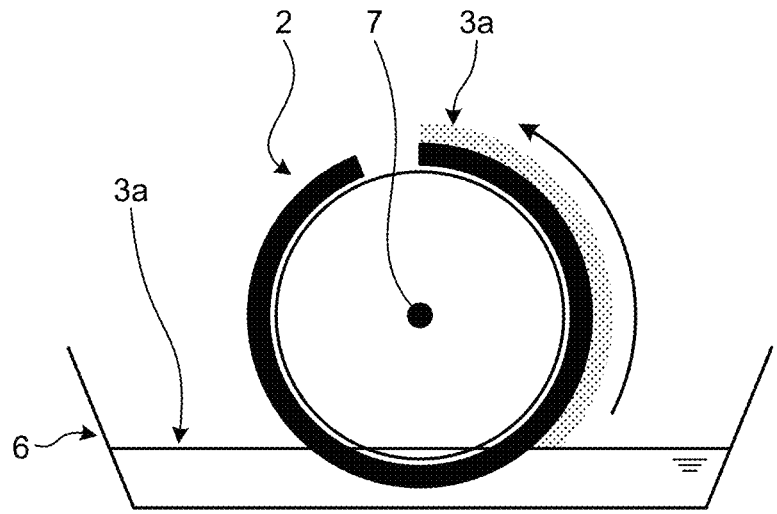
FIG. 5 is a diagram illustrating production of the preparation for fiber length measurement according to the embodiment of the present invention.
Figure 6:
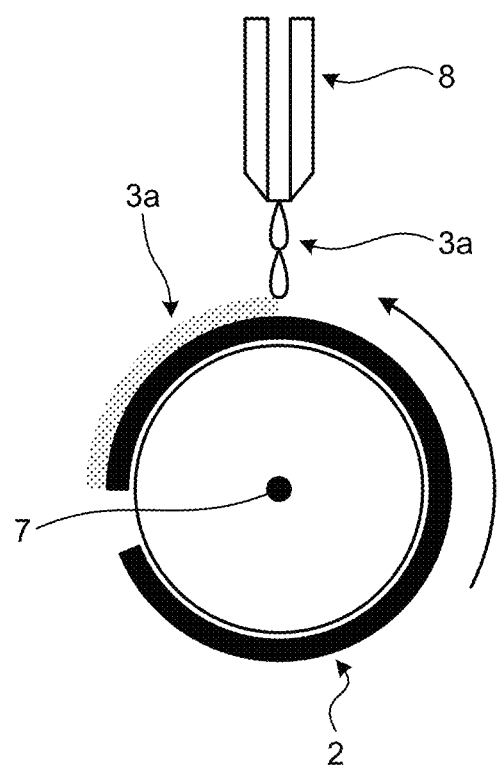
FIG. 6 is a diagram illustrating production of the preparation for fiber length measurement according to the embodiment of the present invention.

Formation of the polymer coating 3 on the base 2 can be performed as illustrated in FIG. 4 to FIG. 6, for example. FIG. 4 to FIG. 6 are diagrams illustrating production of the preparation 1 for fiber length measurement according to the embodiment of the present invention.

For example, as illustrated in FIG. 4, the base 2 is placed on a stainless vat 6, and with the stainless vat 6 fixed by means of a magnet or the like, a dispersion liquid 3a for fiber length measurement shaken immediately before to be uniformly dispersed is dropped thereon. When the base 2 with an A5 size is used, the dispersion liquid 3a for fiber length measurement in an amount of about 5 g is preferably used. A cast amount of the dispersion liquid for fiber length measurement is preferably weighed. The dispersion liquid 3a for fiber length measurement has a high viscosity, and the stainless vat 6 is tilted, whereby the dispersion liquid 3a for fiber length measurement is spread onto the base 2 (Step S4).

The base 2 on which the dispersion liquid 3a for fiber length measurement is placed is dried in a drier at 70° C. to remove the solvent in the dispersion medium and to produce the preparation for fiber length measurement, in which the polymer coating 3 closely adheres to the base 2 and is laminated on the base 2 (Step S5). Drying may be performed such that the polymer coating 3 is formed and adheres to the base 2 and may be set as appropriate in accordance with the solvent and the polymer used and the like. Apart from dropping of the dispersion liquid 3a for fiber length measurement onto the base 2, the dispersion liquid 3a for fiber length measurement can also be spread onto the base 2 by, as illustrated in FIG. 5, immersing a drum 7 around which the base 2 is wound into the stainless vat 6 into which the dispersion liquid 3a for fiber length measurement has been poured and rotating the drum 7. As illustrated in FIG. 6, the dispersion liquid 3a for fiber length measurement may be dropped onto the drum 7 around which the base 2 is wound via a discharge fitting 8 to spread the dispersion liquid 3a for fiber length measurement onto the base 2 by rotating the drum 7.

<Method for Measuring Fiber Length>

Figure 7:
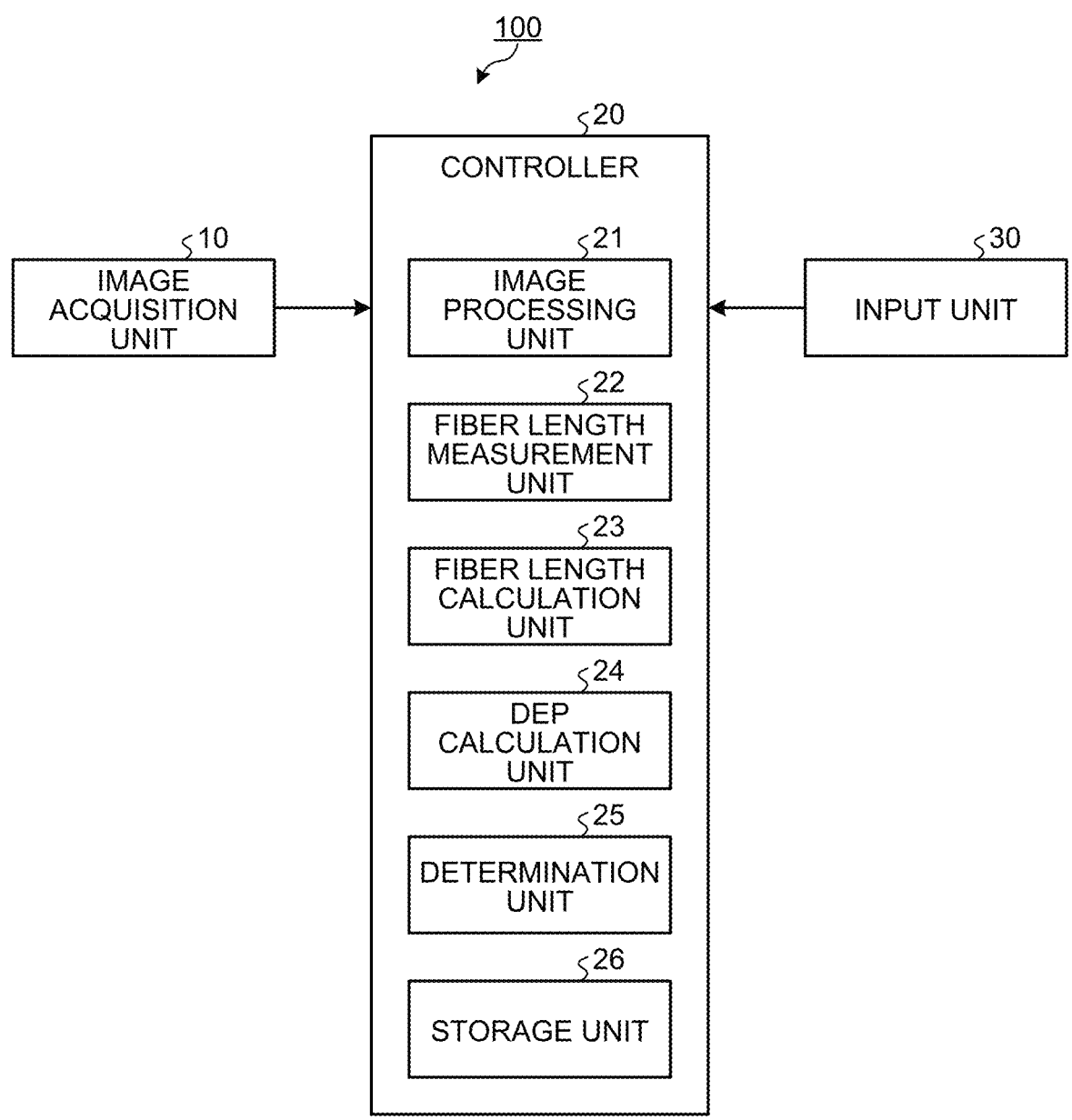
FIG. 7 is a block diagram of a fiber length measurement apparatus according to the embodiment of the present invention.

FIG. 7 is a block diagram of a fiber length measurement apparatus 100 according to the embodiment of the present invention.

The fiber length of fibers can be measured by the fiber length measurement apparatus 100 illustrated in FIG. 7. The fiber length measurement apparatus 100 includes an image acquisition unit 10 acquiring a digital image of the preparation 1 for fiber length measurement, a controller 20 controlling units, and an input unit 30 receiving input of various kinds of information.

As the image acquisition unit 10, a scanner acquiring the digital image of the preparation 1 for fiber length measurement or the like can be used.

The controller 20 has an image processing unit 21, a fiber length measurement unit 22, a fiber length calculation unit 23, a DEP calculation unit 24, a determination unit 25, and a storage unit 26. The controller 20 is implemented by using a central processing unit (CPU) executing various kinds of processing computer programs, a read only memory (ROM) storing therein the various kinds of processing computer programs and the like in advance, and a random access memory (RAM) storing therein arithmetic parameters of each processing and the like. As the controller 20, a general-purpose computer such as a work station or a personal computer can be used.

The image processing unit 21 performs image processing on the digital image acquired by the image acquisition unit 10 to acquire a binary-converted image.

The fiber length measurement unit 22 measures the fiber length of the fibers 4 contained in the preparation 1 for fiber length measurement by needle-shape separation measurement from the binary-converted image acquired by the image processing unit 21.

The fiber length calculation unit 23 calculates fiber length distribution, a median, a number average fiber length and/or a weight average fiber length from the fiber length of the fibers 4 measured by the fiber length measurement unit 22.

The DEP calculation unit 24 calculates a dispersibility evaluation parameter (DEP) represented by Expression (1) below of the preparation 1 for fiber length measurement:

$$DEP = \frac{Wcounted}{Wpredicted} \quad (1)$$

Wcounted: a total of the mass of the fibers 4 calculated from the fiber length of the fibers 4 in the preparation 1 for fiber length measurement determined by measurement, which can be calculated by Expression (2) below.

$$Wcounted = A_f p_f \sum_{i=1}^{n} l_i \quad (2)$$

In Expression (2), $A_f$ is a section (m²) of the fibers 4, $P_f$ is a density (Kg/m³) of the fibers 4, $l_i$ is a length (m) of the fibers 4 measured ith. $A_f$ is calculated from Expression (3) below.

$$A_f = \frac{tex}{10^6 p_f n_{fb}} \quad (3)$$

In Expression (3), tex is a denier (g/km) of the fibers 4, and $n_{fb}$ is a filament.

Wpredicted: a total of the mass of the fibers 4 contained in the preparation 1 for fiber length measurement predicted from the mass and the concentration of the dispersion liquid 3a for fiber length measurement used for production of the preparation 1 for fiber length measurement, which can be calculated from Expression (4) below:

$$Wpredicted = C_f w_{cl} \quad (4)$$

In Expression (4), $C_f$ is the concentration of the dispersion liquid 3a, and $W_{cl}$ is the mass (kg) of the dispersion liquid 3a for fiber length measurement used for production of the preparation 1 for fiber length measurement.

The determination unit 25 determines whether DEP of the preparation 1 for fiber length measurement calculated by the DEP calculation unit 24 is 0.7 to 1.3.

The controller 20 causes the storage unit 26 to store therein only the fiber length of the preparation 1 for fiber length measurement, DEP of which has been determined to be 0.7 to 1.3 by the determination unit 25. The fiber length calculation unit 23 calculates the fiber length distribution, the median, the number average fiber length and/or the weight average fiber length using only the fiber length stored in the storage unit 26, that is, the fiber length of the preparation 1 for fiber length measurement, DEP of which is 0.7 to 1.3.

The input unit 30 receives input of various kinds of information. The information received by the input unit 30 is the section, the density, the denier, the filament of the fibers 4 required for DEP calculation and the mass and the concentration of the dispersion liquid 3a for fiber length measurement used for production of the preparation 1 for fiber length measurement, for example.

Figure 8:
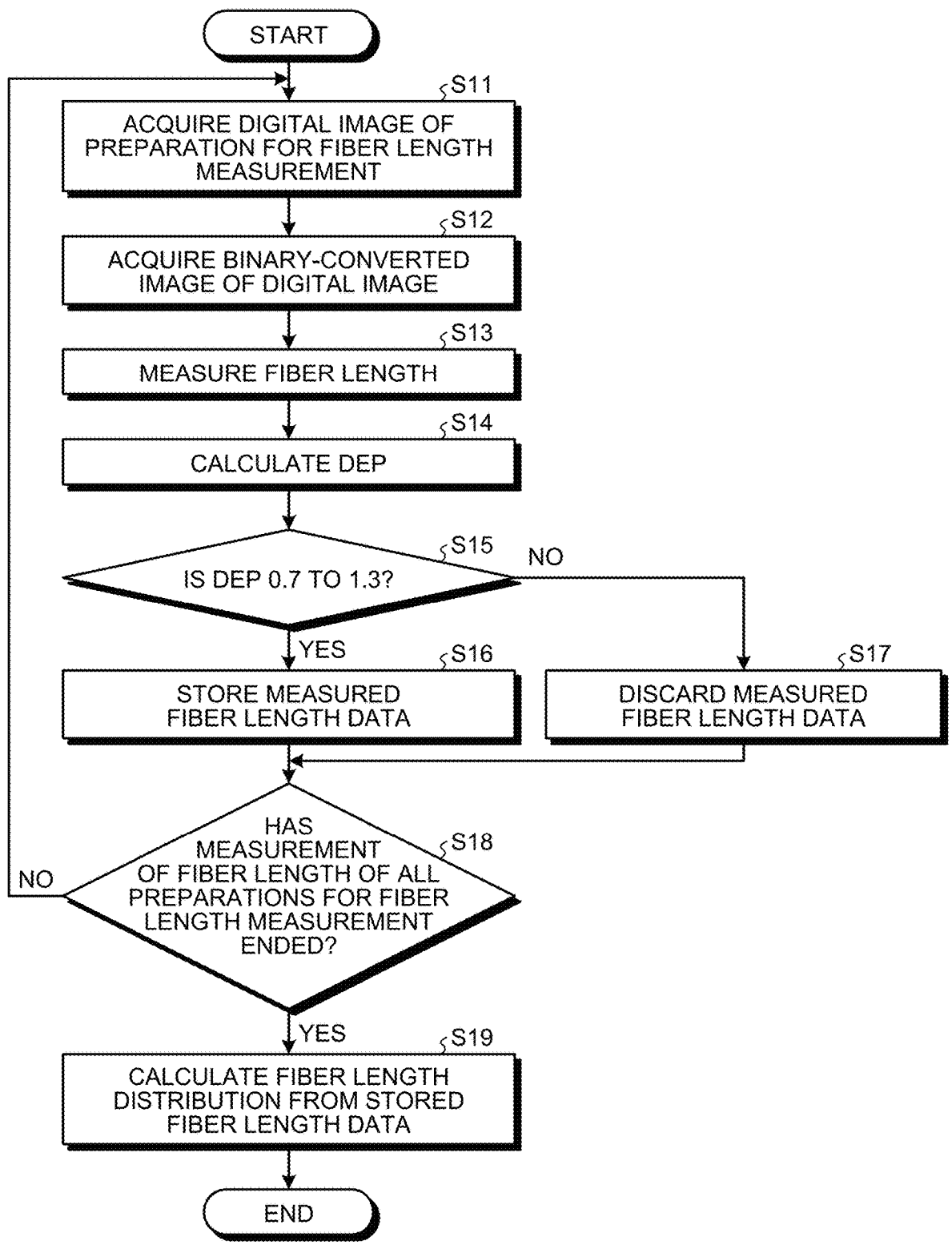
FIG. 8 is a flowchart illustrating a method for measuring a fiber length according to the embodiment of the present invention.

The following describes the method for measuring a fiber length in detail with reference to FIG. 8. FIG. 8 is a flowchart illustrating the method for measuring a fiber length according to the embodiment of the present invention.

First, a digital image of the preparation 1 for fiber length measurement is acquired by the image acquisition unit 10 of GT-X830 or the like (Step S11). The resolution of the digital image may be selected as appropriate depending on the sample measured, which is preferably about 600 to 3,600 dpi.

After the digital image is acquired (Step S11), a binary-converted image is acquired using image editing software such as "Photoshop (registered trademark)" (Step S12). Binarization of the digital image is achieved by making the digital image grayscale, performing automatic contrast processing, trimming, and adjustment of luminance variations, and then performing binarization with a certain threshold (e.g., 128). The image obtained by binarization is synthesized with the digital image acquired at Step S11 by multiplication, and a new layer is added from above. Using this layer, the binary-converted image is corrected. After the end of correction, the method of synthesis is switched from multiplication to the normal, and the layer is coupled to be stored as the binary-converted image.

Figure 9:
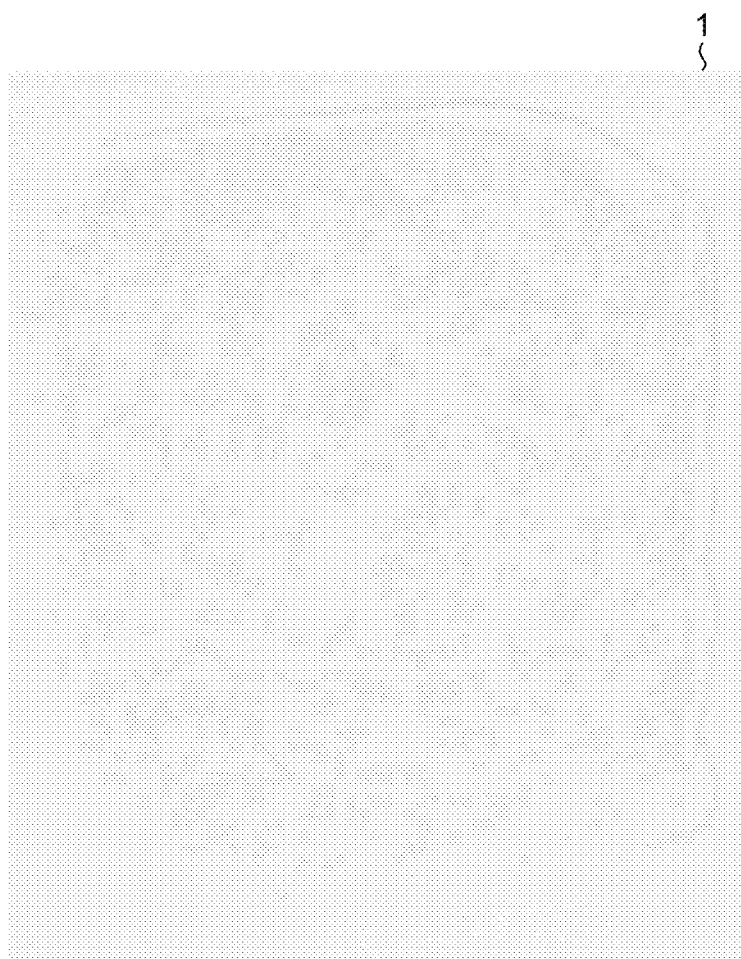
FIG. 9 is a diagram of an exemplary image of the preparation for fiber length measurement according to the embodiment of the present invention.
Figure 10:
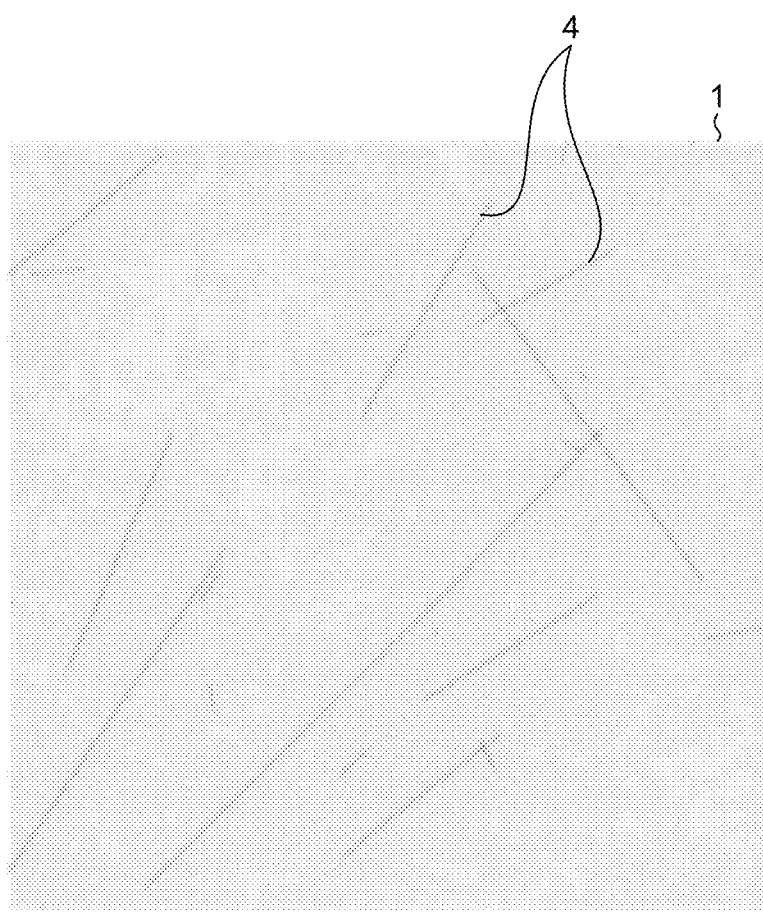
FIG. 10 is an enlarged view of FIG. 9.
Figure 11:
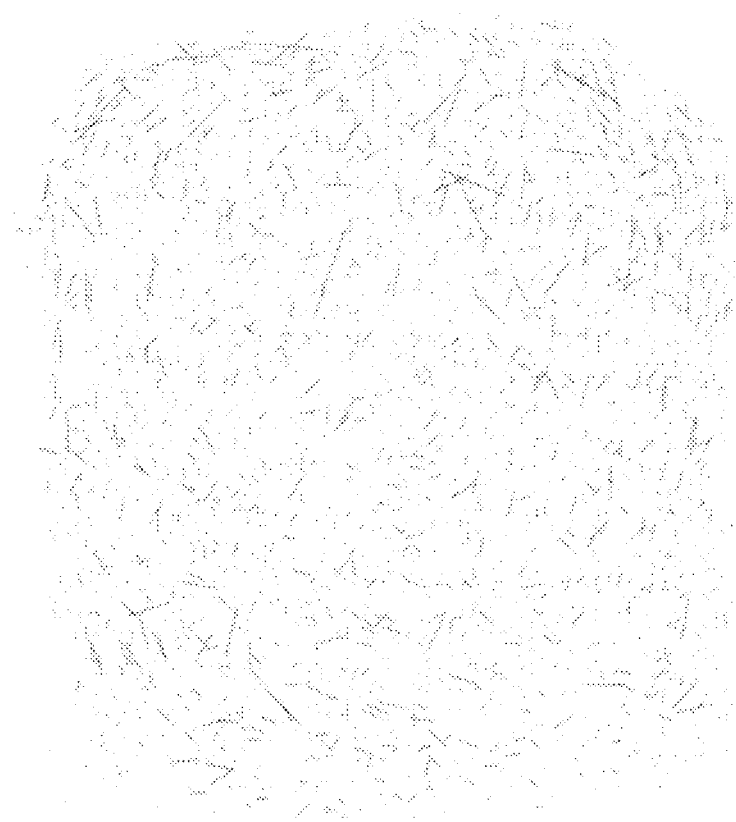
FIG. 11 is a binary-converted image of FIG. 9.
Figure 12:
FIG. 12 is a binary-converted image of FIG. 10.

FIG. 9 is a diagram of an exemplary image of the preparation 1 for fiber length measurement according to the embodiment of the present invention. FIG. 10 is an enlarged view of FIG. 9. FIG. 11 is a binary-converted image of FIG. 9. FIG. 12 is a binary-converted image of FIG. 10. By acquiring the binary-converted image as described above, the fibers 4 in the preparation 1 for fiber length measurement can clearly be visually recognized.

From the obtained binary-converted image, the fiber length is measured using image analysis software such as WinRoof (Step S13). In measurement of the fiber length, a calibration value is set in accordance with the resolution of the digital image, black areas of the binary-converted image are recognized, and areas with a what is called circularity of 0.7 or more are deleted. Images with a circularity of 0.7 or more are deleted because they are highly unlikely to be the fibers 4. When the resolution is x (dpi), the calibration value is set to 25.4/x (mm/pixel).

For the areas recognized as the black areas, the needle-shape separation measurement is performed with a minimum measurement length of 12 pixels and a maximum measurement width of 12 pixels as thresholds. When the areas recognized as the black areas are not desired areas, the image processing at Step S12 is performed again, or a binary-converted area is corrected. The needle-shape separation measurement is preferably performed with the areas recognized as the black areas expanded by 2 pixels. This is because expansion by 2 pixels makes the fibers 4 that are bent likely to be recognized as straight lines. The thresholds are values set based on a comparison result with values measured from a microphotograph of the fibers 4.

From the fiber length measured at Step S13, the DEP calculation unit 24 calculates DEP represented by Expression (1) below (Step S14):

$$DEP = \frac{Wcounted}{Wpredicted} \quad (1)$$

Wcounted is a total of the mass of the fibers 4 calculated from the fiber length of the fibers 4 in the preparation 1 for fiber length measurement measured at Step S13, whereas Wpredicted is a total of the mass of the fibers 4 contained in the preparation 1 for fiber length measurement predicted from the mass and the concentration of the dispersion liquid 3a for fiber length measurement used for production of the preparation 1 for fiber length measurement. Information on the section, the density, the denier, and the filament of the fibers 4 required for calculation of Wcounted and Wpredicted, the mass and the concentration of the dispersion liquid 3a for fiber length measurement used for production of the preparation 1 for fiber length measurement, and the like is received to be input by the input unit 30, and from the information and the measured fiber length, DEP is calculated. When the fiber length measurement (Step S13) is performed with the areas expanded, 4 pixels (0.042332 mm) is subtracted from the measured fiber length to give an actual fiber length.

The determination unit 25 determines whether DEP is 0.7 to 1.3 (Step S15). DEP is an evaluation parameter of the dispersibility of the dispersion liquid 3a for fiber length measurement. The determination unit 25 determines whether there has been sampling bias when the dispersion liquid 3a for fiber length measurement is prepared. DEP being close to 1 means that sampling has been performed without any bias from the preliminary dispersion liquid uniformly dispersed. DEP being less than 1 means that sampling has been performed from a part lower in concentration of the preliminary dispersion liquid. DEP being greater than 1 means that sampling has been performed from a part higher in concentration of the preliminary dispersion liquid.

If DEP of the preparation 1 for fiber length measurement is 0.7 to 1.3 (Yes at Step S15), the controller 20 causes the storage unit 26 to store therein fiber length data measured at Step S13 (Step S16). If DEP of the preparation 1 for fiber length measurement is not 0.7 to 1.3 (No at Step S15), the controller 20 discards the fiber length data measured at Step S13 (Step S17).

Whether measurement of the fiber length of all the produced preparations 1 for fiber length measurement has ended is determined (Step S18); if it has ended (Yes at Step S18), the fiber length calculation unit 23 calculates the fiber length distribution, the median, the number average fiber length and/or the weight average fiber length from the fiber length data stored in the storage unit 26, and the fiber length measurement ends (Step S19). If measurement of the fiber length for all the preparations 1 for fiber length measurement has not ended (No at Step S18), the process is repeated from Step S11.

In the method for measuring a fiber length, DEP is measured, whereby sampling bias in preparation of the dispersion liquid 3a for fiber length measurement can be evaluated, the data when the fiber length distribution and the like is calculated having bias in sampling is not used, and the fiber length distribution and the like with less error can be obtained.

The fiber length distribution and the like may be calculated from the fiber length of the preparation 1 for fiber length measurement, DEP of which is not 0.7 to 1.3. For example, as illustrated in FIG. 2, when Preparations 1A to 1F for Fiber Length Measurement are produced from the types of dispersion liquids for fiber length measurement (A-1-1 to F-1-1) prepared by allocating the whole amount of the preliminary dispersion liquid, and the fiber length of Preparations 1A to 1F for Fiber Length Measurement is measured, sampling bias is highly likely to occur in the allocation from the preliminary dispersion liquid, which is high in concentration, to Containers A to F. This is because even when sampling bias occurs in the allocation from the preliminary dispersion liquid to Containers A to F, when the whole amount of the preliminary dispersion liquid is allocated to Containers A to F and the dispersion liquids for fiber length measurement (A-1-1 to F-1-1) are prepared for each of the types (A to F) using this preliminary dispersion liquid, influence caused by sampling bias is averaged.

For example, when DEP of the preparation 1 for fiber length measurement is not 0.7 to 1.3, the preparation 1 for fiber length measurement can be produced using a dispersion liquid for fiber length measurement again prepared from a preliminary dispersion liquid of the same type as the dispersion liquid for fiber length measurement used for the preparation 1 for fiber length measurement and of the same type as a younger-generation dispersion liquid, and the fiber length distribution, the median, the number average fiber length and/or the weight average fiber length can also be determined from the measured fiber length data.

For example, when DEP of Dispersion Liquid A-1-1 for Fiber Length Measurement illustrated in FIG. 2 is not 0.7 to 1.3, sampling error might have occurred when dispensing and dilution are performed from the first-generation Dispersion Liquid A-1. Given this situation, part of the first-generation Dispersion Liquid A-1 of the same type is again dispensed and is diluted with the dispersion medium to prepare Dispersion Liquid A-1-2 for Fiber Length Measurement, and Preparation 1A' for Fiber Length Measurement is produced from the prepared Dispersion Liquid A-1-2 for Fiber Length Measurement. Based on the fiber length data of Preparation 1A' for Fiber Length Measurement and the fiber length data of other Preparations 1B to 1F for Fiber Length Measurement, the fiber length distribution, the median, the number average fiber length and/or the weight average fiber length are determined, whereby the influence of sampling bias that has occurred in the dispensing and dilution processes of the first generation and later generations can be reduced. Sampling error can occur also when dispensing and dilution are performed from the preliminary dispersion liquid. In such a case, the fiber length distribution and the like may be calculated by, not preparing Dispersion Liquids A to F using the whole amount of the preliminary dispersion liquid as illustrated in FIG. 2, dispensing the preliminary dispersion liquid from the remaining preliminary dispersion liquid to new Container G, repeating dilution with the dispersion medium, preparing Dispersion Liquid G-1-1 for Fiber Length Measurement, producing Preparation 1G for Fiber Length Measurement from the prepared Dispersion Liquid G-1-1 for Fiber Length Measurement, and based on the fiber length data of Preparation 1G for Fiber Length Measurement and the fiber length data of the other Preparations 1B to 1F for Fiber Length Measurement.

Examples (1) Fiber Breakage in Production of Preparation for Fiber Length Measurement A mat with the controlled length of carbon fibers (fiber length (nominal value): 3 mm or 6 mm) was produced by what is called papermaking, carbon fibers were collected from the mat, and breakage of the carbon fibers occurring in production of the preparation for fiber length measurement was examined. The carbon fibers in an amount of 0.23 g were dispersed in a dispersion medium (a 15% by mass aqueous solution of Poval (registered trademark) PVA-217SB) to prepare 287.5 g of a preliminary dispersion liquid with a concentration of 0.080% by mass. The preliminary dispersion liquid was prepared by adding the carbon fibers and the dispersion medium to a sealable container and shaking the container with a lid in an up-and-down direction.

The preliminary dispersion liquid was shaken, which was visually recognized to be uniformly dispersed, and then 40 g of the preliminary dispersion liquid was poured into another container. Into this container, four times amount of the dispersion medium (the 15% by mass aqueous solution of PVA-217SB) was further poured to prepare a dispersion liquid with a concentration of 0.017% by mass (a first generation).

The dispersion liquid with a concentration of 0.017% by mass (the first generation) was shaken, which was visually recognized to be uniformly dispersed, and then 40 g of this dispersion liquid was poured into another container. Into this container, four times amount of the dispersion medium (a 10% by mass aqueous solution of PVA-217SB) was further poured to prepare a dispersion liquid for fiber length measurement with a concentration of 0.0033% by mass (a second generation).

The dispersion liquid for fiber length measurement with a concentration of 0.0033% by mass was shaken, which was visually recognized to be uniformly dispersed, and then 5 g of this dispersion liquid for fiber length measurement was dropped on an OHP film cut into an A5 size (polyethylene terephthalate (PET) with a thickness of 100 μm) and was spread. The OHP film was dried at 70° C. to obtain a preparation for fiber length measurement.

Figure 13:
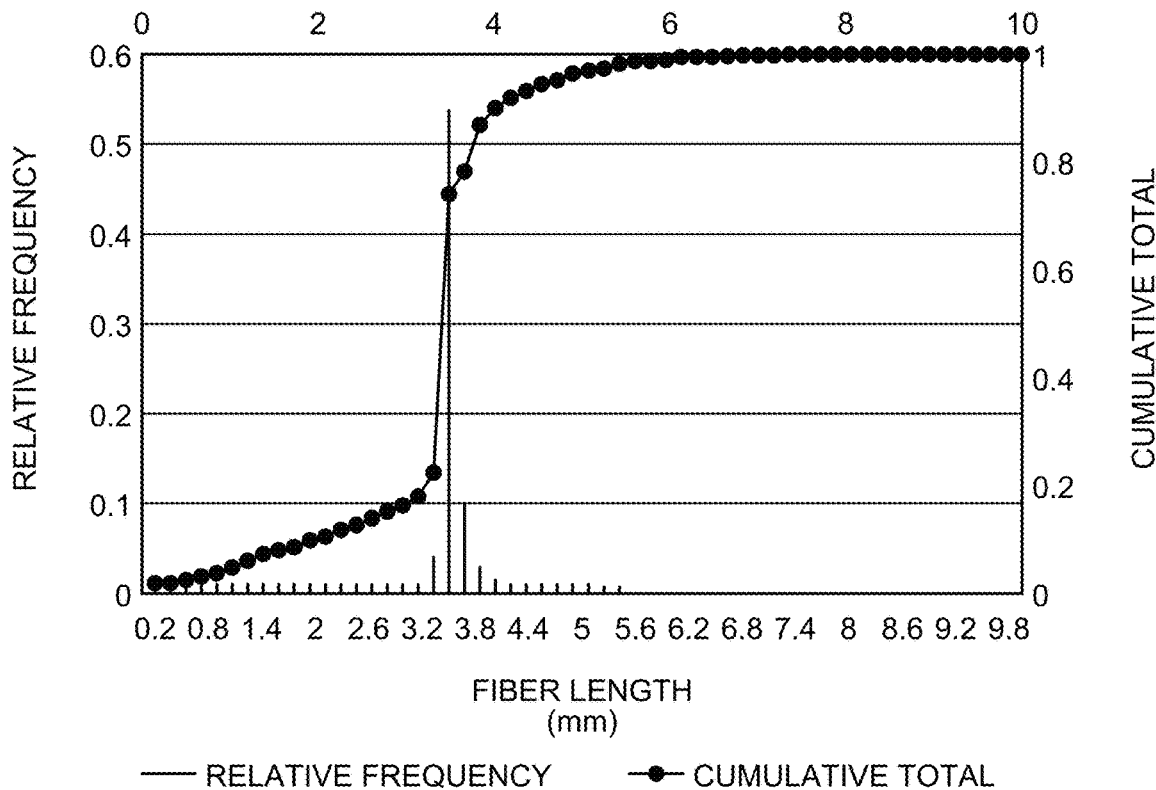
FIG. 13 is a diagram of a relation among a fiber length, a relative frequency, and a cumulative total of a preparation for fiber length measurement containing fibers with a fiber length of 3 mm.
Figure 14:
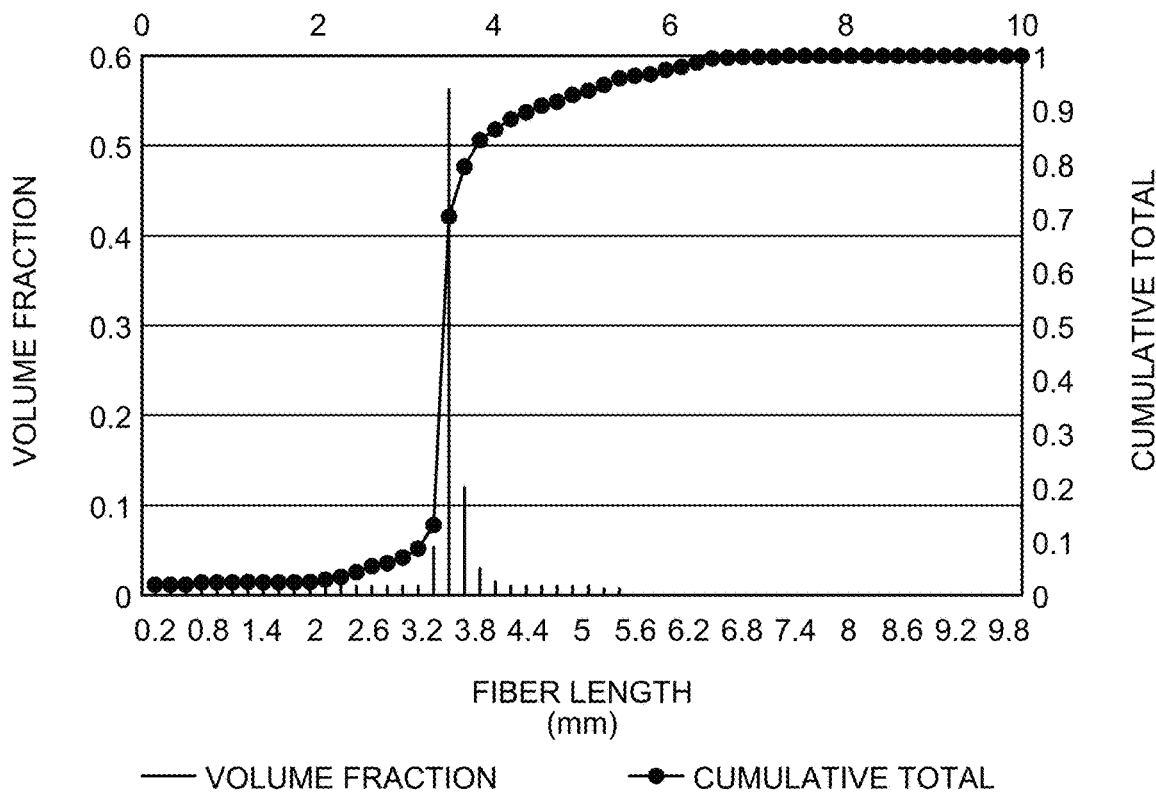
FIG. 14 is a diagram of a relation among the fiber length, a volume fraction, and a cumulative total of the preparation for fiber length measurement containing fibers with a fiber length of 3 mm.
Figure 15:
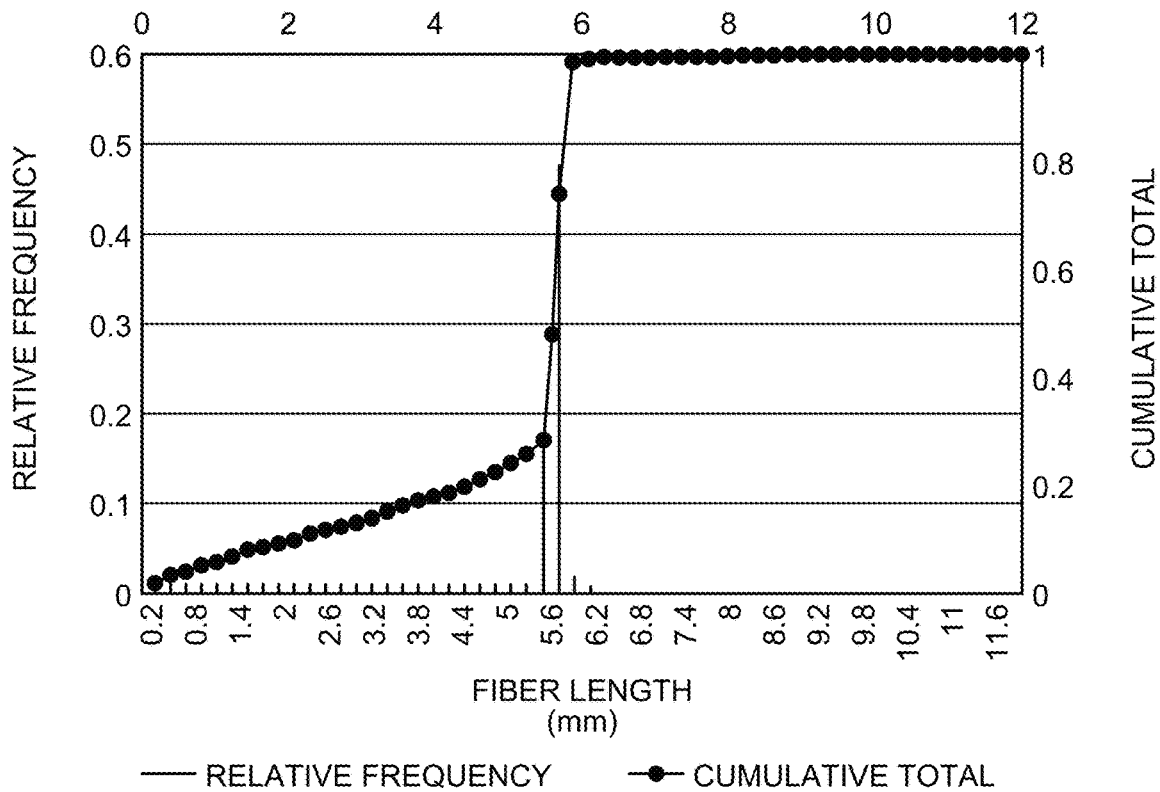
FIG. 15 is a diagram of a relation among a fiber length, a relative frequency, and a cumulative total of a preparation for fiber length measurement containing fibers with a fiber length of 6 mm.
Figure 16:
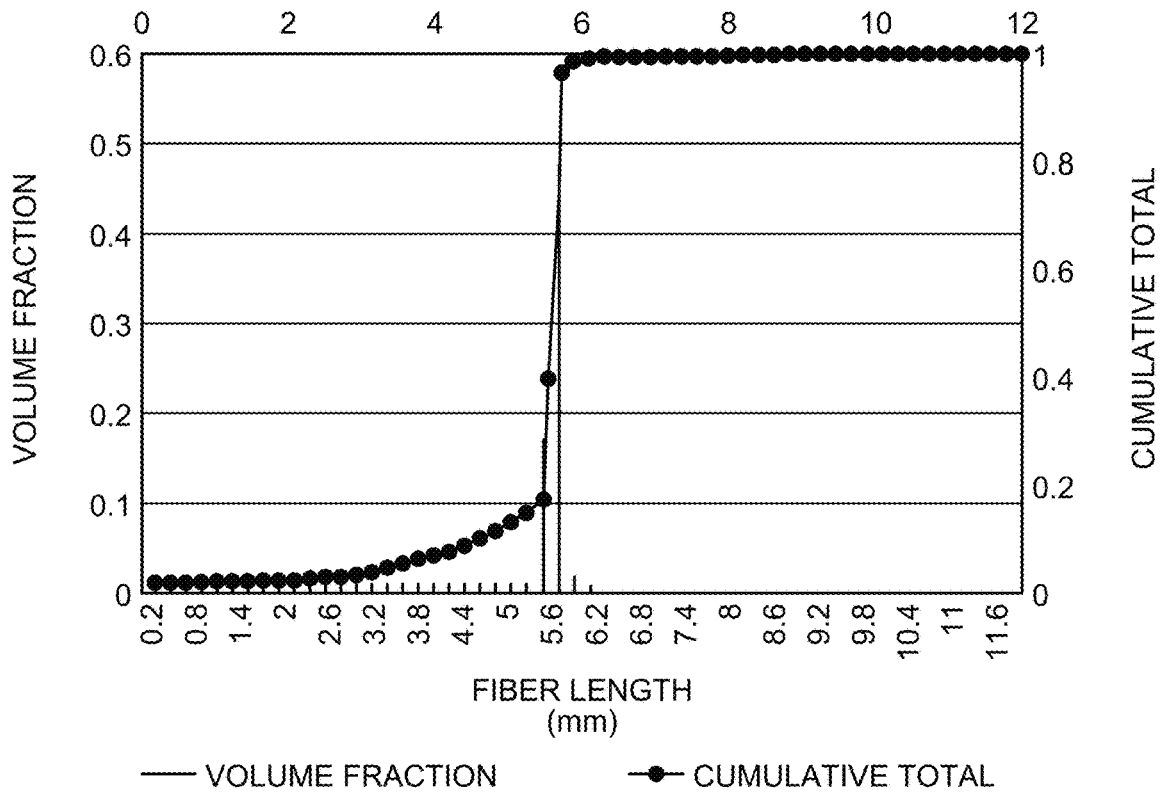
FIG. 16 is a diagram of a relation among the fiber length, a volume fraction, and a cumulative total of the preparation for fiber length measurement containing fibers with a fiber length of 6 mm.

The produced preparation for fiber length measurement was scanned with GT-X830 with a resolution of 2,400 dpi to obtain a digital image. For the digital image, a binary-converted image was acquired with Photoshop, and then a fiber length was measured from the binary-converted image with WinRoof. For the obtained fiber length data, a relative frequency and a volume fraction were determined. FIG. 13 to FIG. 16 illustrate results. FIG. 13 is a diagram of a relation among the fiber length, the relative frequency, and a cumulative total of the preparation for fiber length measurement containing fibers with a fiber length of 3 mm, whereas FIG. 14 is a diagram of a relation among the fiber length, the volume fraction, and a cumulative total. FIG. 15 is a diagram of a relation among the fiber length, the relative frequency, and a cumulative total of the preparation for fiber length measurement containing fibers with a fiber length of 6 mm, whereas FIG. 16 is a diagram of a relation among the fiber length, the volume fraction, and a cumulative total.

According to the result of the mat containing the carbon fibers with a fiber length of 3 mm (the nominal value), as illustrated in FIGS. 13 and 14, carbon fibers exceeding 2.4 mm corresponding to 80% of the nominal value occupied 87% in terms of the number of fibers and 95% in terms of mass. According to the result of the mat containing the carbon fibers with a fiber length of 6 mm (the nominal value), as illustrated in FIGS. 15 and 16, carbon fibers exceeding 4.8 mm corresponding to 80% of the nominal value occupied 78% in terms of the number of fibers and 89% in terms of mass. A longer fiber length provides a higher possibility that the carbon fibers will break; it has been determined that the method for producing a preparation for fiber length measurement of the present invention can sufficiently inhibit breakage of the fibers.

Figure 17:
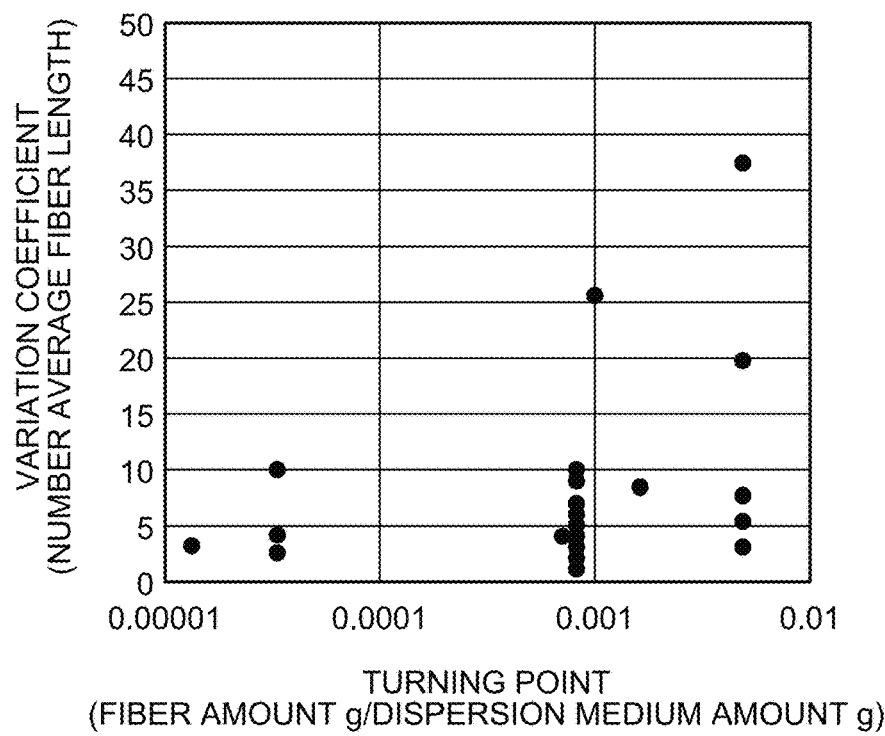
FIG. 17 is a diagram of a relation between the concentration of a dilution condition (a turning point) and a variation coefficient of a number average fiber length among dispersion liquids for fiber length measurement.
Figure 18:
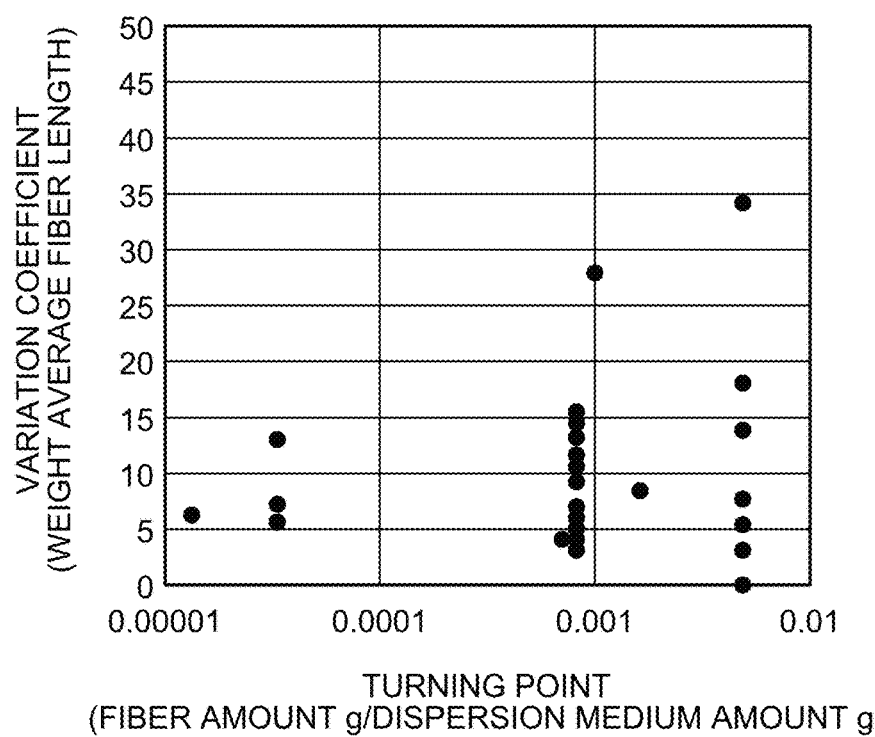
FIG. 18 is a diagram of a relation between the concentration of the dilution condition (the turning point) and a variation coefficient of a weight average fiber length among the dispersion liquids for fiber length measurement.
Figure 19:
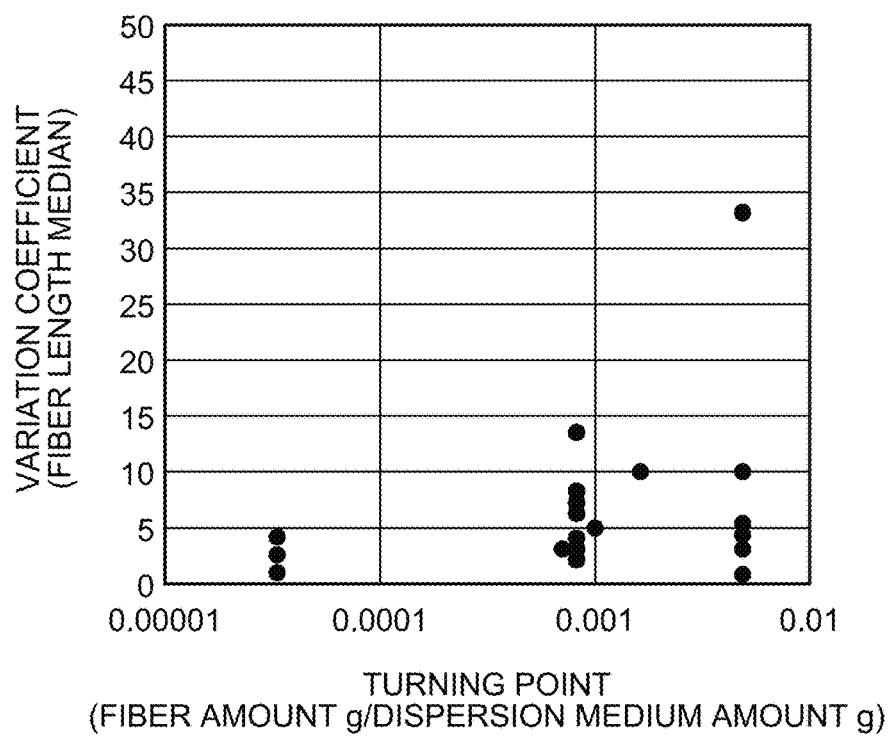
FIG. 19 is a diagram of a relation between the concentration of the dilution condition (the turning point) and a variation coefficient of a fiber length median among the dispersion liquids for fiber length measurement.
Figure 20:
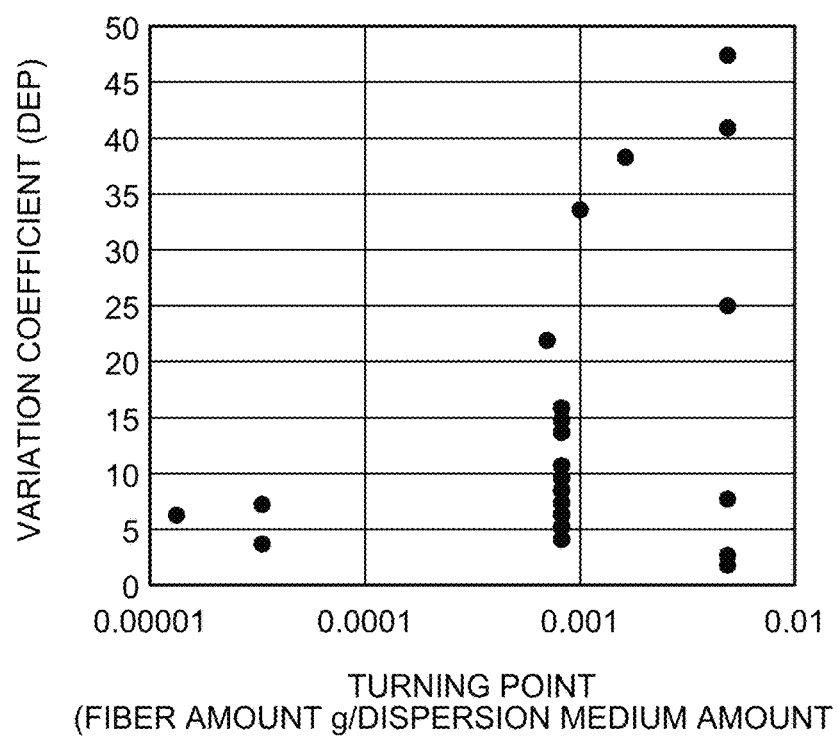
FIG. 20 is a diagram of a relation between the concentration of the dilution condition (the turning point) and a variation coefficient of DEP among the dispersion liquids for fiber length measurement.
Figure 21:
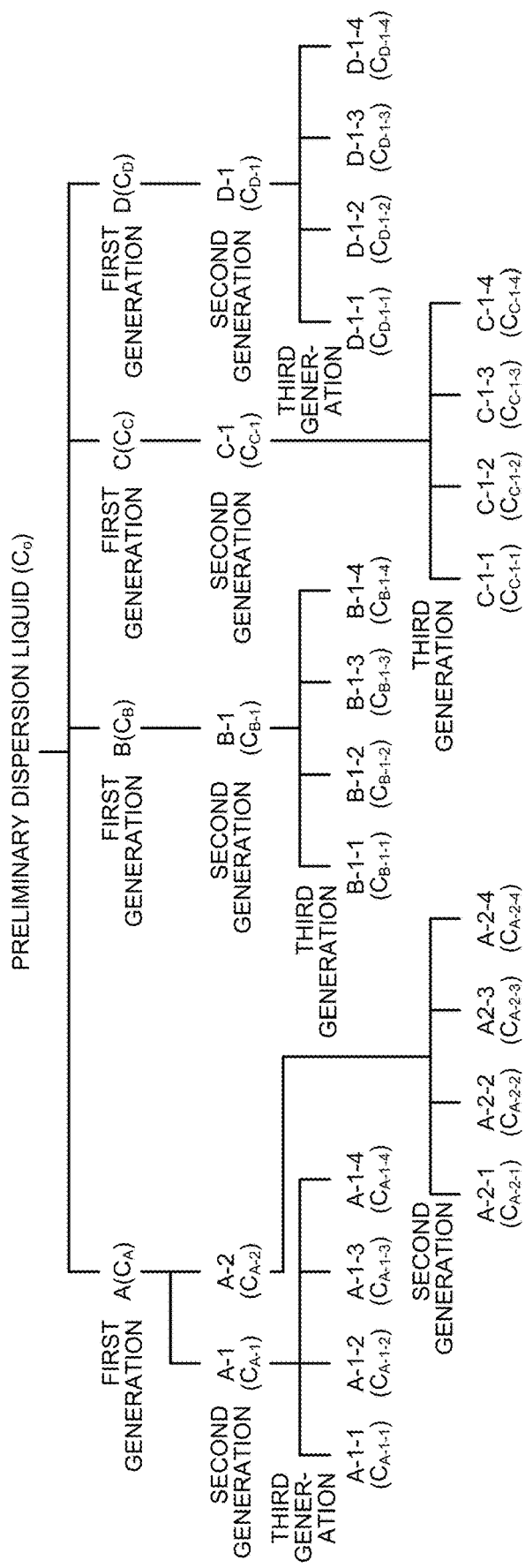
FIG. 21 is a diagram illustrating the dilution condition (the turning point) of the dispersion liquid for fiber length measurement.

(2) Dilution Condition and Accuracy of Dispersion Liquid for Fiber Length Measurement A dilution condition and accuracy of the dispersion liquid for fiber length measurement were determined when the dispersion liquid for fiber length measurement is prepared from the preliminary dispersion liquid by multistep dilution to produce the preparation for fiber length measurement. FIG. 17 is a diagram of a relation between the concentration of a dilution condition (a turning point) and a variation coefficient of a number average fiber length among dispersion liquids for fiber length measurement. FIG. 18 is a diagram of a relation between the concentration of the dilution condition (the turning point) and a variation coefficient of a weight average fiber length among the dispersion liquids for fiber length measurement. FIG. 19 is a diagram of a relation between the concentration of the dilution condition (the turning point) and a variation coefficient of a fiber length median among the dispersion liquids for fiber length measurement. FIG. 20 is a diagram of a relation between the concentration of the dilution condition (the turning point) and a variation coefficient of DEP among the dispersion liquids for fiber length measurement. FIG. 21 is a diagram illustrating the dilution condition (the turning point) of the dispersion liquid.

For example, as illustrated in FIG. 21, the whole amount of a preliminary dispersion liquid with Concentration $C_0$ is allocated to Containers A to D and is diluted with a dispersion medium to prepare first-generation Dispersion Liquids A to D with Concentrations $C_A$ to $C_D$, respectively. Part of Dispersion Liquid A is dispensed to two Containers A-1 and A-2, which are each diluted with the dispersion medium to prepare second-generation Dispersion Liquids A-1 and A-2 with Concentrations $C_{A-1}$ and $C_{A-2}$, respectively. The rest of Dispersion Liquid A may be stored or discarded. Furthermore, part of Dispersion Liquid A-1 is dispensed to four Containers A-1-1 to A-1-4, which are each diluted with the dispersion medium to prepare third-generation Dispersion Liquids A-1-1 to A-1-4 for Fiber Length Measurement with Concentrations $C_{A-1-1}$ to $C_{A-1-4}$, respectively. Part of Dispersion Liquid A-2 is dispensed to four Containers A-2-1 to A-2-4, which are each diluted with the dispersion medium to prepare third-generation Dispersion Liquids A-2-1 to A-2-4 for Fiber Length Measurement with Concentrations $C_{A-2-1}$ to $C_{A-2-4}$, respectively. Similarly, from Dispersion Liquids B to D, second-generation Dispersion Liquids B-1 to D-1 are prepared, respectively, and from Dispersion Liquids B-1 to D-1, third-generation Dispersion Liquids B-1-1 to B-1-4, C-1-1 to C-1-4, and D-1-1 to D-1-4 for Fiber Length Measurement are prepared.

A plurality of (n) preparations for fiber length measurement are produced from each of Dispersion Liquids A-1-1 to A-1-4, A-2-1 to A-2-4, B-1-1 to B-1-4, C-1-1 to C-1-4, and D-1-1 to D-1-4 for Fiber Length Measurement, and the fiber length of the produced preparations for fiber length measurement is measured; FIG. 17 to FIG. 20 illustrate relations between the variation coefficients obtained by calculating the number average fiber length, the weight average fiber length, the fiber length median, and DEP for each of the preparations for fiber length measurement and the dilution condition (the turning point).

For example, when the accuracy of the dilution condition between Dispersion Liquids A-1-1 and A-1-2 for Fiber Length Measurement is determined, A-1-1 and A-1-2 have been dispensed and prepared from the same A-1, and the dilution condition (the turning point) is target concentrations ($C_{A-1-1}$, $C_{A-1-2}$). When $C_{A-1-1}$ and $C_{A-1-2}$ are 0.005% by mass (fiber amount g/dispersion medium amount g=1:20,000=0.00005), the variation coefficient of the number average fiber length is 3 to 10 as illustrated in FIG. 17. When the accuracy of the dilution condition between Dispersion Liquids A-1-1 and A-2-1 for Fiber Length Measurement is determined, A-1-1 and A-2-1 have been dispensed and prepared from A-1 and A-2, respectively, and the dilution condition (the turning point) is target concentrations ($C_{A-1}$, $C_{A-2}$) of A-1 and A-2, respectively. When $C_{A-1}$ and $C_{A-2}$ are 0.083% by mass (fiber amount g/dispersion medium amount g=1:1,200=0.00083), the variation coefficient of the number average fiber length is 1 to 10 as illustrated in FIG. 17. When the accuracy of the dilution condition between Dispersion Liquids A-1-1 and B-1-1 for Fiber Length Measurement is determined, A-1-1 and B-1-1 have been dispensed and prepared from A and B, respectively, and the dilution condition (the turning point) is target concentrations ($C_A$, $C_B$) of A and B, respectively. When $C_A$ and $C_B$ are 0.67% by mass (fiber amount g/dispersion medium amount g=1: 150=0.0067), the variation coefficient of the number average fiber length is 3 to 38 as illustrated in FIG. 17.

As illustrated in FIG. 17 to FIG. 20, a higher turning point concentration provides larger variations in the variation coefficient and more unstable accuracy. Concentration $C_0$ of the preliminary dispersion liquid is set to 0.1% by mass or less (in FIG. 17 to FIG. 20, 0.001 g/g because of being shown in terms of fiber amount g/dispersion medium amount g), whereby the variation coefficient is about 15 to 35%. When Concentration $C_0$ of the preliminary dispersion liquid is 0.083% by mass or less (0.00083 g/g), the variation coefficient is 20% or less, which is more preferred.

REFERENCE SIGNS LIST

1 Preparation for fiber length measurement
2 Base
3 Polymer coating
4 Fiber
5 Polymer
6 Stainless vat
7 Drum
8 Discharge fitting
10 Image acquisition unit
20 Controller
21 Image processing unit
22 Fiber length measurement unit
23 Fiber length calculation unit
24 DEP calculation unit
25 Determination unit
26 Storage unit
30 Input unit
100 Fiber length measurement apparatus

The invention claimed is:

1. A method for producing a preparation for fiber length measurement comprising:
   a preliminary dispersion process of adding fibers and a dispersion medium with a viscosity of 500 Pa·s to 10,000 Pa·s to a sealable container so as to give a concentration of the fibers of 0.1% by mass or less and shaking the container to prepare a preliminary dispersion liquid;
   a dispensing process of dispensing part of the preliminary dispersion liquid to another sealable container;
   a dilution process of adding the dispersion medium to the dispensed preliminary dispersion liquid so as to give a concentration of the fibers of 0.005% by mass or less and shaking the container to prepare a dispersion liquid for measuring fiber length; and
   a casting process of spreading part of the dispersion liquid for measuring fiber length onto a base having light transparency.

2. The method for producing a preparation for fiber length measurement according to claim 1, wherein the dispersion medium has light transparency and has a color different from that of the fibers.

3. The method for producing a preparation for fiber length measurement according to claim 1, wherein
   the dispersion medium is a solution in which a polymer is dissolved in a solvent, and the polymer has film formability.

4. The method for producing a preparation for fiber length measurement according to claim 1, wherein
   the dispensing process includes evenly allocating a whole amount of the preliminary dispersion liquid to a plurality of sealable containers, and
   the dilution process includes diluting the preliminary dispersion liquid allocated to each of the sealable containers with the dispersion medium.

5. The method for producing a preparation for fiber length measurement according to claim 3, performing, after the casting process, a polymer coating formation process removing the solvent in the dispersion medium by heating to form a coating of the polymer on the base.

6. A method for preparing a dispersion liquid for fiber length measurement comprising:
   a preliminary dispersion process of adding fibers and a dispersion medium with a viscosity of 500 Pa·s to 10,000 Pa·s to a sealable container so as to give a concentration of the fibers of 0.1% by mass or less and shaking the container to prepare a preliminary dispersion liquid;
   a dispensing process of dispensing part of the preliminary dispersion liquid to another sealable container; and
   a dilution process of adding the dispersion medium to the dispensed preliminary dispersion liquid so as to give a concentration of the fibers of 0.005% by mass or less and shaking the container to prepare a dispersion liquid for measuring fiber length.

7. The method for preparing a dispersion liquid for fiber length measurement according to claim 6, wherein the dispersion medium has light transparency and has a color different from that of the fibers.

8. The method for preparing a dispersion liquid for fiber length measurement according to claim 6, wherein
   the dispersion medium is a solution in which a polymer is dissolved in a solvent, and
   the polymer has film formability.

9. The method for preparing a dispersion liquid for fiber length measurement according to claim 6, wherein
   the dispensing process includes evenly allocating a whole amount of the preliminary dispersion liquid to a plurality of sealable containers, and
   the dilution process includes diluting the preliminary dispersion liquid allocated to each of the sealable containers with the dispersion medium.

10. A method for measuring a fiber length using a preparation for fiber length measurement produced by the method according to claim 1, the method comprising:
    an image acquisition process of acquiring an image of the preparation for fiber length measurement;
    an image processing process of acquiring a binary-converted image of the image; and
    a measurement process of measuring a fiber length of the fibers contained in the preparation for fiber length measurement from the binary-converted image.

11. The method for measuring a fiber length according to claim 10, further comprising a calculation process of determining fiber length distribution, a median, a number average fiber length and/or a weight average fiber length of the fibers from the fiber length of the fibers contained in the preparation for fiber length measurement measured at the measurement process.

12. The method for measuring a fiber length according to claim 11, wherein
    the preparation for fiber length measurement is produced by:
    the dispensing process evenly allocating a whole amount of a preliminary dispersion liquid to a plurality of sealable containers; and the dilution process diluting the preliminary dispersion liquid allocated to each of the sealable containers with the dispersion medium, and the calculation process determines the fiber length distribution, the median, the number average fiber length and/or the weight average fiber length from the fiber length of the fibers of the preparation for fiber length measurement each produced from at least one dispersion liquid for fiber length measurement obtained from each type of the preliminary dispersion liquid allocated at the dispensing process.

13. The method for measuring a fiber length according to claim 11, wherein the calculation process determines the fiber length distribution, the median, the number average fiber length and/or the weight average fiber length from the fiber length of the fibers of the preparation for fiber length measurement DEP represented by Expression (1) below of which is 0.7 to 1.3:

$$DEP = \frac{Wcounted}{Wpredicted} \quad (1)$$

Wcounted: a total of a mass of the fibers in the preparation for fiber length measurement calculated from the fiber length of the fibers in the preparation for fiber length measurement determined by measurement;

Wpredicted: a total of a mass of the fibers contained in the preparation for fiber length measurement predicted from a mass and a concentration of the dispersion liquid for fiber length measurement used for production of the preparation for fiber length measurement.

14. The method for measuring a fiber length according to claim 13, wherein when DEP of the preparation for fiber length measurement is not 0.7 to 1.3, the calculation process measures a fiber length of the fibers of a preparation for fiber length measurement produced using a dispersion liquid for fiber length measurement again prepared from a preliminary dispersion liquid of the same type as the dispersion liquid for fiber length measurement used for the preparation for fiber length measurement to determine the fiber length distribution, the median, the number average fiber length and/or the weight average fiber length.

15. A preparation for fiber length measurement produced according to the method of claim 1 which comprises:
a base having light transparency; and
a polymer coating laminated on the base, containing fibers, and having light transparency,
the polymer coating having a color different from that of the fibers.

16. The preparation for fiber length measurement according to claim 15, wherein
the base is a polymer film with a thickness of 50 μm to 3,000 μm, and
a thickness of the polymer coating is ½ or more of a diameter of the fibers.

17. The preparation for fiber length measurement according to claim 16, wherein the polymer coating is formed by spreading a dispersion liquid for fiber length measurement containing the fibers and a dispersion medium with a concentration of the fibers of 0.005% by mass or less onto the base and removing a solvent, the dispersion medium having a viscosity of 500 Pa·s to 10,000 Pa·s.

18. The preparation for fiber length measurement according to claim 15, wherein DEP represented by Expression (1) below is 0.7 to 1.3:

$$DEP = \frac{Wcounted}{Wpredicted} \quad (1)$$

Wcounted: a total of a mass of the fibers in the preparation for fiber length measurement calculated from the fiber length of the fibers in the preparation for fiber length measurement determined by measurement;

Wpredicted: a total of a mass of the fibers contained in the preparation for fiber length measurement predicted from a mass and a concentration of the dispersion liquid for fiber length measurement used for production of the preparation for fiber length measurement.

19. A fiber length measurement apparatus comprising:
an image acquisition unit configured to acquire a digital image of a preparation for fiber length measurement produced by the method according to claim 1;
an image processing unit configured to perform image processing on the digital image to generate a binary-converted image;
a fiber length measurement unit configured to measure a fiber length of the fibers contained in the preparation for fiber length measurement from the binary-converted image; and
a fiber length calculation unit configured to calculate fiber length distribution, a median, a number average fiber length and/or a weight average fiber length from the measured fiber length of the fibers.

20. The fiber length measurement apparatus according to claim 19, further comprising:
a DEP calculation unit configured to calculate DEP of the preparation for fiber length measurement represented by Expression (1) below:

$$DEP = \frac{Wcounted}{Wpredicted} \quad (1)$$

Wcounted: a total of a mass of the fibers of the preparation for fiber length measurement calculated from the fiber length of the fibers in the preparation for fiber length measurement determined by measurement;

Wpredicted: a total of a mass of the fibers contained in the preparation for fiber length measurement predicted from a mass and a concentration of the dispersion liquid for fiber length measurement used for production of the preparation for fiber length measurement;

a determination unit configured to determine whether DEP of the preparation for fiber length measurement is 0.7 to 1.3; and a controller configured to cause a storage unit to store therein only the fiber length of the preparation for fiber length measurement, DEP of which is 0.7 to 1.3, wherein the fiber length calculation unit is configured to calculate the fiber length distribution, the median, the number average fiber length and/or the weight average fiber length using only the fiber length stored in the storage unit.

21. A non-transitory computer-readable recording medium with an executable program stored thereon, the program being a control computer program for a fiber length measurement apparatus executing:
an image acquisition procedure of acquiring a digital image of a preparation for fiber length measurement produced by the method according to claim 1;

an image processing procedure of performing image processing on the digital image to generate a binary-converted image;

a fiber length measurement procedure of measuring a fiber length of the fibers contained in the preparation for fiber length measurement from the binary-converted image; and a fiber length calculation procedure of calculating a number average fiber length and/or a weight average fiber length from the fiber length of the fibers.

* * * * *